(12) United States Patent
Karuga et al.

(10) Patent No.: US 6,573,321 B2
(45) Date of Patent: Jun. 3, 2003

(54) NON-STAINING COATING COMPOSITION

(75) Inventors: Hidehito Karuga, Ibaraki (JP); Shigeto Kamimura, Ibaraki (JP); Hiroshi Nakai, Ibaraki (JP); Hisashi Suzuki, Ibaraki (JP); Tadahiko Ikeuchi, Ibaraki (JP); Kenichi Ishigaki, Ibaraki (JP); Kensuke Kurimoto, Ibaraki (JP); Takanori Nakashoya, Ibaraki (JP)

(73) Assignee: Sk Kaken Co., Ltd. (JP)

( * ) Notice: Subject to any disclaimer, the term of this patent is extended or adjusted under 35 U.S.C. 154(b) by 79 days.

(21) Appl. No.: 09/911,197

(22) Filed: Jul. 23, 2001

(65) Prior Publication Data

US 2002/0077397 A1 Jun. 20, 2002

Related U.S. Application Data

(62) Division of application No. 09/125,548, filed as application No. PCT/JP97/04247 on Nov. 20, 1997, now Pat. No. 6,271,293.

(30) Foreign Application Priority Data

| Nov. 22, 1996 | (JP) | 8-311695 |
| Nov. 29, 1996 | (JP) | 8-334628 |
| Dec. 6, 1996 | (JP) | 8-342670 |
| Dec. 13, 1996 | (JP) | 8-353013 |
| Mar. 19, 1997 | (JP) | 9-085631 |

(51) Int. Cl.$^7$ ............ C08K 5/5415; C08L 33/08; C08L 33/10; C08L 43/04; C08L 83/06
(52) U.S. Cl. ............ 524/265; 524/243; 524/244; 524/247; 524/251; 524/267; 524/588; 524/731; 524/832; 524/837; 524/506; 524/560
(58) Field of Search ............ 524/243, 244, 524/247, 251, 265, 267, 588, 731, 832, 837, 506, 560

(56) References Cited

U.S. PATENT DOCUMENTS

| 5,626,964 A | * | 5/1997 | Blizzard et al. ............ 428/412 |
| 5,662,961 A | * | 9/1997 | Tenitsu et al. ............ 427/58 |
| 6,271,293 B1 | | 8/2001 | Karuga et al. |

FOREIGN PATENT DOCUMENTS

WO  WO 94/06870 A1  3/1994

* cited by examiner

*Primary Examiner*—Peter Szekely
(74) *Attorney, Agent, or Firm*—Webb Ziesenheim Logsdon Orkin & Hanson, P.C.

(57) ABSTRACT

An anti-contamination coating composition is obtained by mixing a tetraalkoxysilane condensate having an average condensation degree of 4 to 20 and has an alkyl group having 1 to 2 carbon atoms and an alkyl group having 3 to 10 carbon atoms, or an alkyl group having 1 to 3 carbon atoms and an alkyl group having 4 to 12 carbon atoms, the alkyl group having 3 to 10 carbon atoms or 4 to 12 carbon atoms present in the amount of 5 to 50% by equivalent based on all alkyl groups in the condensate, with a polyurethane resin, an acrylic copolymer resin or a silicone-acrylic copolymer resin in the amount of 1.0 to 40.0 parts by weight in term of $SiO_2$ relative to 100 parts by weight of the polyol compound. The addition of a hydrophilic alkoxysilane having a poly alkylene oxide chain compound is also suitable. The coating composition forms an anti-contamination coat having hydrophilicity on the surface, soil-release effect and excellent stain resistance to oil, and is also suitable for outside wall coating of buildings, having excellent interlaminar adhesion when multiple coatings are applied.

6 Claims, 1 Drawing Sheet

NON-STAINING COATING COMPOSITION

CROSS-REFERENCE TO RELATED APPLICATION

This application is a divisional of co-pending U.S. patent application Ser. No. 09/125,548 filed Aug. 27, 1998, now U.S. Pat. No. 6,271,292 granted Aug. 7, 2001, which is the national phase of PCT/JP97/04247 filed Nov. 20, 1997.

TECHNICAL FIELD

The present invention relates to an anti-contamination coating composition used for surface finishing of various materials such as metal, glass, porcelain tile, concrete, sideboard, extrusion-molded plate, plastic and the like. More particularly, it relates to an anti-contamination coating composition used for coating finishing of structures such as building structures, bridges and the like, which can also be coated directly on a substrate and can also be used in a coating composition used as a final finishing coating such as various finishing coatings, pattern coating, coating for forming the stone-like surface, coating for forming the patterned surface or the like.

BACKGROUND ART

Coating finishing has hitherto been performed to protect a substrate of building structures, or civil engineering structures, and to impart design and to improve the appearance. However, a large amount of oily contaminants have recently been floating in the air as a result of an exhaust gas discharged from automobiles in the center of the city and suburbs thereof. When those oily contaminants adhere to the surface of the coat formed by using a high-durability coating, a considerable sooty or striped contamination (hereinafter referred to as "rain-striped contamination") occurs, therefore, the coating finishing provided to improve the scene of the city was meaningless sometimes.

Japanese Patent Kokai Publication No. 4-370176 discloses a coating comprising a segmented polymer containing a hydrophilic segment such as polyalkylene oxide segment and a hydrophobic segment such as polysiloxane. This coating is capable of obtaining such an effect that water derived from rainfall penetrates/flows into the interface between the coat and contaminants to wash off contaminants together with water (soil release effect) by imparting the hydrophilicity to the coat surface. Although the hydrophilicity is imparted when water is present on the coat surface, the hydrophobicity is actually imparted when the coat surface has no opportunity to contact with water for a long period of time. Therefore, there is a problem that it takes a considerably long time to convert the hydrophobicity of the coat surface into the hydrophilicity during rainfall, so that the contamination during rainfall can not be prevented.

Japanese Patent Application No. 6-506632 (International Publication WO94/06870) discloses an anti-contamination coating composition wherein organosilicate is added in the coating and the coat surface is hydrophilized by the reaction thereof and, furthermore, a soil release effect is utilized. The organosilicate forms a silanol group or a siloxane bond by the hydrolysis reaction in the presence of an acid catalyst, and this silanol group or siloxane bond imparts the hydrophilicity to the coat surface. Taking actual coating on the outside wall of buildings into consideration, the reaction may proceed by acidic rain, but it takes a considerably long period of time after formation of the coat to obtain the hydrophilic surface enough to sufficiently exert the soil release effect, similar to the above technique.

Japanese Patent Kokai Publication No. 6-145453 discloses a method of mixing an acrylic silicone resin with organosilicate to obtain a hydrophilic coat. According to this technique, a large amount of organosilicate is required to impart sufficient hydrophilicity to the coat. However, when a large amount of organosilicate is added, the crosslink density of the coat becomes too large and the coat becomes brittle. At the same time, a large amount of siloxane bonds are introduced to cause deterioration of the chemical resistance of the coat, which results in deterioration of the weathering resistance of the coat as contradiction.

In such a way, among coats formed by using conventional anti-contamination coating, those requiring a long period of time to hydrophilize the surface can cause rain-striped contamination within a very short period of time after application of the coating.

Originally, the anti-contamination coating has the effect of causing no contamination, and users and builders who request the coating expect that effect. Accordingly, the fact that contamination arises even at the initial stage after formation of the coat fails to meet the expectation of these users and builder temporarily, and the fact also imparts a sense of unease to the anti-contamination effect for a long period of time. Since a conventional anti-contamination coating has a main object of washing out contaminants by rainfall, the anti-contamination coating is inferior in stain resistance of once adhered contamination. It has been found that, when there is no rainfall for a long period of time, oily contamination penetrates into the coat to cause contamination which is hardly washed out by rainfall no longer.

An object to be solved by the present invention is to obtain an anti-contamination coating composition for providing an anti-contamination coat, which has a soil release effect of washing out contaminants because the surface exerts the hydrophilicity immediately after formation of the coat, not showing hydrophilicity by an action formed after formation of the coat, such as waterfall, and which is strong but not brittle because of its specific crosslinked structure, and has excellent stain resistance to oily contamination, good weathering resistance and good coat physical properties.

Another object to be solved by the present invention is to provide a coating composition which can improve the interlaminar adhesion (hereinafter referred to as a "recoating property") when multi-layer coating is performed on a topcoat layer after curing an undercoat layer using a reaction curing type polyurethane or polyurethane-acrylic anti-contamination coating, and effectively prevent blister, crack or lifting (a phenomenon wherein shrinkage occurs on the coat surface as a result of dissolution of the uncured portion of the undercoat layer by a solvent of the coating of the topcoat layer because of insufficient curing and adhesion of the coat of the undercoat layer in case of multiple coating) caused with a lapse of time.

Such an anti-contamination high-durability coating is exclusively a solution type of an organic solvent. With recent enhancement of the environmental awareness, there have been used those using as weak a solvent as possible. Furthermore, it has been required to convert into an aqueous coating.

It is generally considered that, when organosilicate (i.e. alkyl silicate) is added in the coating, it reacts with water in the air during the formation of the coat, and an alkoxysilyl group Si—OR is converted into a silanol group Si—OH and alkyl silicates having a silanol group are arranged on the coat surface, thereby exhibiting the hydrophilicity.

It is assumed that, when using a resin which is only dissolved in a solvent having high dissolving power, since the coat is certainly hydrophilic and the anti-contamination effect can also be obtained, such a surface orientation occurs. When using a urethane resin using a polyol having a solubility parameter of about 6.5 to 9.5, which is also dissolved or dispersed in a solvent having low dissolving power, there arise white turbidity of a film and such phenomenon that the anti-contamination is not obtained. Therefore, there is much room for improvement.

A finishing coating material whose main material layer has rubber elasticity referred to as a waterproofing multi-layer coating material, which is used in coating finishing performed in the case of a substrate of building structures, civil engineering structures, etc., has been noted and widely used because it has a follow-up property to crazing (hereinafter referred to as "crack") of the outside wall of concrete and an effect for inhibition of penetration of a carbon dioxide gas.

This waterproofing multi-layer coating material is composed of an undercoat layer, a main material (a continuous layer and a patterned layer, which have rubber elasticity) and a topcoat material, but the topcoat layer is coated with an elastic coating following the main material layer. When coating finishing is performed on the whole outside wall including the butt portion (joint portion) between boards joined by using a sealing material in a dry technique using a dry building material represented by sideboard, extruded plate, etc., an elastic coating capable of following movement of the sealing material driven portion is used. Furthermore, an elastic coating is often used to a raw material such as metal, wherein degree of expansion and shrinkage is comparatively large, and to a substrate whose structural movement is assumed.

However, there is a problem in that the coat obtained from these elastic coatings is generally inferior in resistance to surface contamination to a rigid coat.

Under these circumstances, the present inventors have found that, by mixing a hydrophilic alkoxysilane compound containing an alkylene oxide chain with an acrylic silicone resin and an alkyl silicate (organosilicate), as described in Japanese Patent Kokai Publication No. 9-31401, hydrophilization is exhibited from the comparatively initial stage in the coat surface to be formed from the composition. However, there was much room for improvement in anti-contamination performance immediately after formation of the coat.

The alkyl silicate (organosilicate) used in a conventional anti-contamination coating is closely related to brittleness of the formed coat, depending on the amount and combination with the kind of the used resin. Therefore, there is a fear of causing crack in the coat. Furthermore, the alkyl silicate (organosilicate) is very expensive as a raw material for coating and, therefore, it was a large problem to coating makers in view of the raw material cost.

That is, the problems to be solved by the present invention are as follows.

(i) To obtain an anti-contamination coating composition for providing an anti-contamination coat, which has a soil release effect of washing out contaminants because the surface exerts the hydrophilicity immediately after formation of the coat, not showing hydrophilicity by an action formed after formation of the coat, such as rainfall, etc., and has excellent stain resistance to oily contamination, good weathering resistance and good coat physical properties.

(ii) To provide a coating composition, which can improve the interlaminar adhesion (hereinafter referred to as a "recoating property") when multi-layer coating is performed, and effectively prevent blister, crack or lifting caused with a lapse of time.

(iii) To provide a coating composition, which has characteristics of the above items (i) and (ii), and can use a weak solvent which hardly causes environmental problems.

(iv) To provide a coating composition, which has characteristics of the above items (i) and (ii), and forms an elastic coat which hardly causes crazing with a lapse of time.

(v) To provide a coating composition, which exerts the same effect even if the amount of an expensive silicate compound mixed becomes lower in order to exhibit excellent soil-release effect immediately after formation of the coat, and also contributes to reduce the cost.

DISCLOSURE OF INVENTION

The present inventors have intensively studied to solve contamination immediately after coating as an object of coating obtained by mixing organolisilicate or a condensate thereof with an organic coating base. As a result, the present inventors have found that coating having very excellent anti-contamination effect immediately after coating is obtained by mixing a tetraalkoxysilane condensate (C1) or (C2), which is a condensate of a tetraalkoxysilane with a combination of a short-chain alkyl group and a long-chain alkyl group in place of the alkyl group, not a tetraalkoxysilane or a simple condensate thereof, with coating. Thus, the present invention has been accomplished.

The present invention is composed of a combination of the following resins and additives.

(1) A composition which is mainly composed of a combination of a polyurethane-forming component (PU-I) and (C1).

(2) A composition which is mainly composed of a combination of a polyurethane-forming component (PU-II) and (C2). This composition is characterized in that a weak solvent can be used, particularly.

(3) A composition which is composed of a combination of a polyurethane-forming component (PU-III) and (C1) and polycaprolactone diol and/or polycaprolactone polyol as an essential component. This composition forms a coat having elasticity, particularly.

(4) A composition which is mainly composed of a combination of an acrylic copolymer resin (AC) and (C1).

(5) A composition which is mainly composed of a combination of an alkoxysilyl group-containing acrylic copolymer resin (AS) and (C1).

The present invention will be described in detail hereinafter.

The anti-contamination coat composition of the present invention comprises a polyol compound (A1), a polyisocyanate compound (B1) and a tetraalkoxysilane condensate (hereinafter referred to as an "alkoxysilane condensate" or an "alkyl silicate condensate", sometimes), wherein the polyol compound and polyisocyanate compound are contained in a ratio of 0.6 to 1.4 in terms of a NCO/OH ratio and the tetraalkoxysilane condensate is contained in the amount of 1.0 to 40.0 parts by weight in term of $SiO_2$ relative to 100 parts by weight of the content of the polyol compound, and wherein the polyol compound (A1) has a weight-average molecular weight of 5000 to 80000 and a hydroxyl group value of 20 to 150 (KOH mg/g) and the tetraalkoxysilane condensate is a tetraalkoxysilane condensate (C1), which has an average condensation degree of 4 to 20 and has an alkyl group having 1 to 2 carbon atoms and an alkyl group having 3 to 10 carbon atoms, the alkyl group having 3 to 10 carbon atoms being contained in the amount of 5 to 50% by equivalent based on all alkyl groups in the condensate.

By adopting such a construction, there can be obtained a coating, which is extremely superior in effect of preventing contamination immediately after coating to the case where a hydrophilic alkoxysilane compound alone or its condensate is added, and which has a soil-release effect and is also superior in stain resistance to oily contamination, weathering resistance and other coat physical properties.

When the molecular weight of the above polyol is smaller than 5000, the curing property and durability of the coat are not sufficient. On the other hand, when the molecular weight is larger than 80000, the finishing property of the coat is not sufficient. Considering the change of the other raw materials, the molecular weight is preferably within the range from 20000 to 60000 because the coat having stable characteristics is formed.

When the hydroxyl group value is less than 20 KOH mg/g, the durability and contamination resistance of the coat are poor. On the other hand, when the hydroxyl group value exceeds 150 KOH mg/g, the durability and flexibility of the coat are insufficient. When the hydroxyl group value is within the range from 30 to 100 KOH mg/g, particularly excellent characteristics can be obtained.

The glass transition point of these polyols is from −10 to 150° C., preferably from 10 to 100° C. When the glass transition point is lower than −10° C., the contamination removing property and contamination recovering property are poor. On the other hand, when the glass transition point is higher than 150° C., the flexibility and durability are poor.

It is considered that, in the present invention, when an alkyl group having 1 to 2 carbon atoms and an alkyl group having 3 to 10 carbon atoms coexist in the tetraalkoxysilane condensate, an anti-contamination coat having excellent surface orientation property and excellent coat physical properties can be formed.

The above tetraalkoxysilane condensate (C1) is contained in the amount of 1.0 to 40.0 parts by weight, preferably from 2.0 to 30.0 parts by weight, in terms of $SiO_2$ relative to 100 parts by weight of the resin solid content of the polyol (A1).

When the amount is smaller than 1.0 parts by weight, the hydrophilicity is not sufficient and, therefore, the contamination resistance is poor. On the other hand, when the amount exceeds 40.0 parts by weight, problems such as poor appearance of the cured coat, crack and the like arise. When the amount is from 2.0 to 30.0 parts by weight, the influence of the material composition is hardly exerted and, therefore, stable characteristics can be obtained.

The hydrophilic alkoxysilane compound (D) containing an alkylene oxide chain can be added to the anti-contamination coating composition of the present invention. Because the hydrophilicity is further imparted to the coat by using in combination with the alkoxysilane condensate (C1), an excellent effect of preventing contamination can be obtained. By using it in combination, there can be obtained an anti-contamination coating composition which is particularly superior in stain resistance of the coat.

The present invention is also directed to an anti-contamination coating composition, wherein the above polyol compound (A1) is a solvent-soluble fluorine-containing copolymer obtained by copolymerizing a fluoroolefin, at least one of a vinyl ester and a vinyl ether, and a hydroxyl group-containing monomer as an essential constituent monomer.

By using a polyol containing fluorine as a polyol component constituting a polyurethane which is a resin component of coating, the long-term weathering resistance and effect of preventing contamination can be further improved.

In the coating composition of the present invention, it is a particularly preferable aspect to add the hydrophilic alkoxysilane compound (D) having a weight-average molecular weight of 150 to 3500 and containing an alkylene oxide chain having repeating units of 2 to 40 in the amount of 0.1 to 20 parts by weight relative to 100 parts by weight of the above polyol compound (A1).

Use of hydrophilic alkoxysilane compound (D) having a hydrophilic polyalkylene oxide chain further enhances the hydrophilicity of the coat immediately after coating thereby to effectively prevent the initial contamination.

As the component of anti-contamination coating of the present invention, an amine compound (E) is also preferably added in amount of 0.02 to 5.0 parts by weight relative to 100 parts by weight of the polyol compound (A1). By using such an amine compound, in addition to the above anti-contamination effect, the recoating property is also improved, and blister caused with a lapse of time in case of multi-layer coating, crack and lifting in case of coating two or more layers can be prevented effectively and, at the same time stiff coat can be formed. Therefore, there can be obtained an anti-contamination coat which is remarkably superior in durability.

In spite of the above amine compound, the compound having a tertiary amino group may be used as a polyol component. The anti-contamination coating composition according to the present invention is characterized in that the polyol compound contains a tertiary amino group-containing acrylpolyol, or the invention relates to the anti-contamination coating composition of the present invention, characterized in that the fluorine-containing copolymer contains a fluorine-containing copolymer having a tertiary amino group. By using such a polyol, the same effect as that obtained by adding an amine compound can be obtained.

The present inventors have intensively studied. As a result, they found that, in the case of the urethane resin coating using a polyol having solubility parameter SP of 6.5 to 9.5, which can be dissolved and/or dispersed in a solvent having particularly weak dissolving force, the coating surface can be hydrophilized by mixing the tetraalkoxysilane low condensate having a specific structure in the coating, thereby making it possible to provide a coat having good contamination resistance. Thus, the present invention has been completed.

The present invention further relates to an anti-contamination coating composition comprising a polyol compound (A2) having a solubility parameter SP of 6.5 to 9.5, a weight-average molecular weight of 5000 to 150000 and a hydroxyl group value of 15 to 100 (KOH mg/g) dissolved and/or dispersed in a non-aqueous solvent, a polyisocyanate compound (B2) in a NCO/OH equivalent ratio of 0.7 to 2.0, a tetraalkoxysilane condensate (C2) which is a condensate of tetraalkoxysilane having an average condensation degree of 4 to 10 and which has an alkyl group having 1 to 3 carbon atoms and an alkyl group having 4 to 12 carbon atoms, the alkyl group having 4 to 12 carbon atoms being contained in the amount of 5 to 50% by equivalent based on all alkyl groups in the condensate, and a hydrophilic alkoxysilane compound (D) having a weight-average molecular weight of 150 to 3500 and containing an alkylene oxide chain having repeating units of 2 to 40, wherein the tetraalkoxysilane condensate (C2) is contained in the amount of 1.0 to 50.0 parts by weight in term of $SiO_2$ and the hydrophilic alkoxysilane compound (D) is contained in the solid content of 1.0 to 20 parts by weight, respectively, relative to 100 parts by weight of the resin solid content of the polyol compound (A2).

The present invention is further characterized by using the same PU-II base as described above, and containing 1.0 to 50.0 parts by weight of tetraalkoxysilane condensate (C2) and an amine compound (E) in the solid content of 0.02 to 5.0 parts by weight, respectively, relative to 100 parts by weight of resin solid content of polyol compound (A2).

When the weight-average molecular weight of A2 is smaller than 5000, a suitable viscosity as the coating is not obtained so that respective physical properties of the coat are poor. On the other hand, when it is larger than 150000, the sharpness and gloss of the coat are lowered, unfavorably. When the hydroxyl group value is smaller than 15 KOH mg/g, the crosslink density is low so that various physical properties and contamination resistance of the coat are poor. On the other hand, when it is larger than 100 KOH mg/g, the crosslink density becomes higher and, therefore, the durability and flexibility of the coat are insufficient and, at the same time, the surface orientation property of the tetraalkoxysilane condensate (C2) is inhibited, unfavorably.

As the component (A2), those having SP of 6.5 to 9.5 are used. By using those having such SP, it is possible to be dissolved and/or dispersed in a solvent having a weak dissolving force referred to as a weak solvent, thereby to prepare a weak solvent type coating. As a matter of course, it is possible to use after dissolving in a strong solvent having a strong dissolving force.

In the urethane resin coating using such a polyol compound (A2), a normal alkyl silicate has poor compatibility and poor surface orientation property so that the coat is contaminated. To the contrary, according to the present invention, the compatibility is good and surface orientation property is excellent and coat is hydrophilized so that a coat having excellent anti-contamination property can be provided. Furthermore, it is able to provide a coating composition having excellent various coat performances.

Furthermore, by adding a hydrophilic alkoxysilane compound (D), the surface of the coat is hydrophilized in the initial stage so that it is possible to provide an anti-contamination coating composition which is superior in contamination resistance and stain resistance.

It is also preferred to provide a composition obtained by adding an amine compound (E). When an anti-contamination coating composition is multi-coated, an effect that interlaminar adhesion becomes good is also exerted.

In the present coating compositions, it is suitable that an aliphatic hydrocarbon is contained in the amount of 50% by weight or more based on the whole solvents in the coating compositions. Therefore, lifting does not take place, thereby making it suitable for repair and an influence on the environment can be reduced.

The anti-contamination coating composition of the present invention may further contain a polyurethane-forming component (PU-III) wherein the polyol compound (A1) is a polyol compound having a glass transition temperature (Tg) of 15 to 100° C. and the polyisocyanate compound (B1) has a concentration of a polyisocyanate group of the solid content of from 3 to 15% by weight, and a polycaprolactone diol and/or polycaprolactone triol (G) having a weight-average molecular weight of 300 to 3000 and a hydroxyl group value of 30 to 550 KOH mg/g are contained in the amount of 1 to 20 parts by weight relative to 100 parts by weight of the solid content of the polyol compound (A1).

In the present invention, the Tg of the polyol compound (A1) is limited. In the case of the coat having the flexibility, when Tg is lower than 15° C., contaminants physically adhere and the contamination resistance is poor, and the weathering resistance is also deteriorated. On the other hand, when it is higher than 100° C., the crack-following property of the undercoat disappears, resulting in poor waterproofing property.

As the polyisocyanate compound (B1), those having a NCO content of 3 to 15%, and more preferably 8 to 12%, based on the solid content of 100% are used.

When the NCO content is less than 3%, it is necessary to mix a large amount of a polyisocyanate compound, resulting in poor durability of the coat, unfavorably. On the other hand, when the NCO content is more than 15%, the coat becomes too hard and, therefore, the expected elastic coat can not be formed and the waterproofing performance is not obtained.

With regard to the component of polycaprolactone diol and/or polycaprolactone triol (G), when the weight-average molecular weight is less than 300, it is not preferable because of insufficient flexibility of the coat. On the other hand, when it is more than 3000, it is not preferable because finishing feel and workability are not satisfactory.

When the amount of such a component (G) is less than 1 part by weight relative to 100 parts by weight of the solid content of the component (A1), the flexibility of the coat is insufficient, unfavorably. When the amount exceeds 20 parts by weight, the weathering resistance of the coat is lowered.

The tetraalkoxysilane condensate component (C1) having a specific structure, wherein alkyl groups having 1 to 2 carbon atoms and those having 3 to 10 carbon atoms coexist, exerts the above effect, thereby obtaining a coating composition capable of forming an anti-contamination coat, which is superior in elasticity and physical properties of the coat. The invention further describes the anti-contamination coating composition wherein a hydrophilic alkoxysilane compound (D) having a weight-average molecular weight of 150 to 3500 and containing an alkylene oxide chain having repeating units of 2 to 40 was added in the amount of 0.1 to 20 parts by weight relative to 100 parts by weight of the solid content of the polyol compound (A1).

As described above, the anti-contamination performance immediately after formation of the coat is remarkably improved.

The present invention is further directed to an anti-contamination coating composition comprising a tetraalkoxysilane condensate (C1) in the amount of 1 to 30 parts by weight in terms of $SiO_2$ relative to 100 parts by weight of the solid content of an acrylic copolymer resin (AC) which contains an acrylate and/or a methacrylate monomer and has a glass transition temperature of 0 to 100° C.

By adopting the above construction, the surface is hydrophilized immediately after formation of the coat and the stain resistance is also excellent. Therefore, there can be obtained an anti-contamination acrylate resin coating composition, which exerts a soil-release effect of wash out contaminants and has good physical properties of the coat.

The anti-contamination coating composition of the present invention further comprises the hydrophilic alkoxysilane compound (D) having a weight-average molecular weight of 150 to 3500 and containing an alkylene oxide chain having repeating units of 2 to 40 in the solid content of 0.1 to 20 parts by weight.

By adding a hydrophilic alkoxysilane compound (D), the anti-contamination type acrylate resin coating composition having better anti-contamination performance in the initial stage can be obtained.

The present invention further relates to an anti-contamination coating composition comprising a compound (C1) which is a tetraalkoxysilane condensate having an average condensation degree of 4 to 20 and which has an alkyl group having 1 to 2 carbon atoms and an alkyl group having 3 to 10 carbon atoms, the alkyl group having 3 to 10 carbon atoms being contained in the amount of 5 to 50% by equivalent based on all alkyl groups in the condensate, in the amount of 1.0 to 20.0 parts by weight, and more preferably 1.0 to 10 parts by weight, in terms of $SiO_2$ relative to 100 parts by weight of the solid content of an alkoxysilyl group-containing acrylic copolymer resin (AS) which has a group represented by the general formula

(chemical formula 1)

wherein $R_1$ represents an alkyl group having 1 to 10 carbon atoms; $R_2$ represents a hydrogen atom or a monovalent hydrocarbon group selected from the group consisting of alkyl, aryl and aralkyl groups having 1 to 10 carbon atoms; and a represents 0, 1 or 2.

The characteristics of the present invention are as follows. That is, since the anti-contamination performance obtained immediately after formation of the coat is better than that of an anti-contamination coating composition containing a conventional alkoxysilyl group-containing acrylic copolymer resin and a tetraalkoxysilane, and the anti-contamination can be obtained by smaller concentration of the alkoxysilyl groups and smaller amount of the tetraalkoxysilane compound in comparison with the prior art, an anti-contamination coating composition, which is advantageous in view of the performance of the coat and cost, can be obtained. In the portion of the alkyl group of the compound (C1), alkyl groups having 1 to 2 carbon atoms and alkyl groups having 3 to 10 carbon atoms coexist so that the compatibility with the component (AS) is remarkably improved similar to the other case, thereby making it possible to form an anti-contamination coating composition which is superior in surface orientation property and physical properties of the coat.

To the anti-contamination coating composition of the present invention, it is preferable to further add the hydrophilic alkoxysilane compound having a weight-average molecular weight of 150 to 3500 and containing an alkylene oxide chain having repeating units of 2 to 40 in the solid content of 0.1 to 20 parts by weight.

Similar to the above case, when the amount of the compound is less than 0.1, sufficient addition effect can not be obtained. When it exceeds 20, the compatibility with the resin component and water resistance of the cured coat are not sufficient.

As described above, the present invention is characterized by using an alkoxysilane condensate (C1) or (C2), the substituted alkyl group varies depending on (C1) or (C2) and its preferable maximal addition amount varies. This is because the compatibility and physical properties imparted to the cured coat vary depending on the objective resin component. The optimum combination and the optimum addition amount are decided according to the resin on the basis of the test.

It is particularly preferred that the alkylene oxide chain of the above hydrophilic alkoxysilane compound (D) is an ethylene oxide chain because high hydrophilicity can be obtained.

Figure 1:
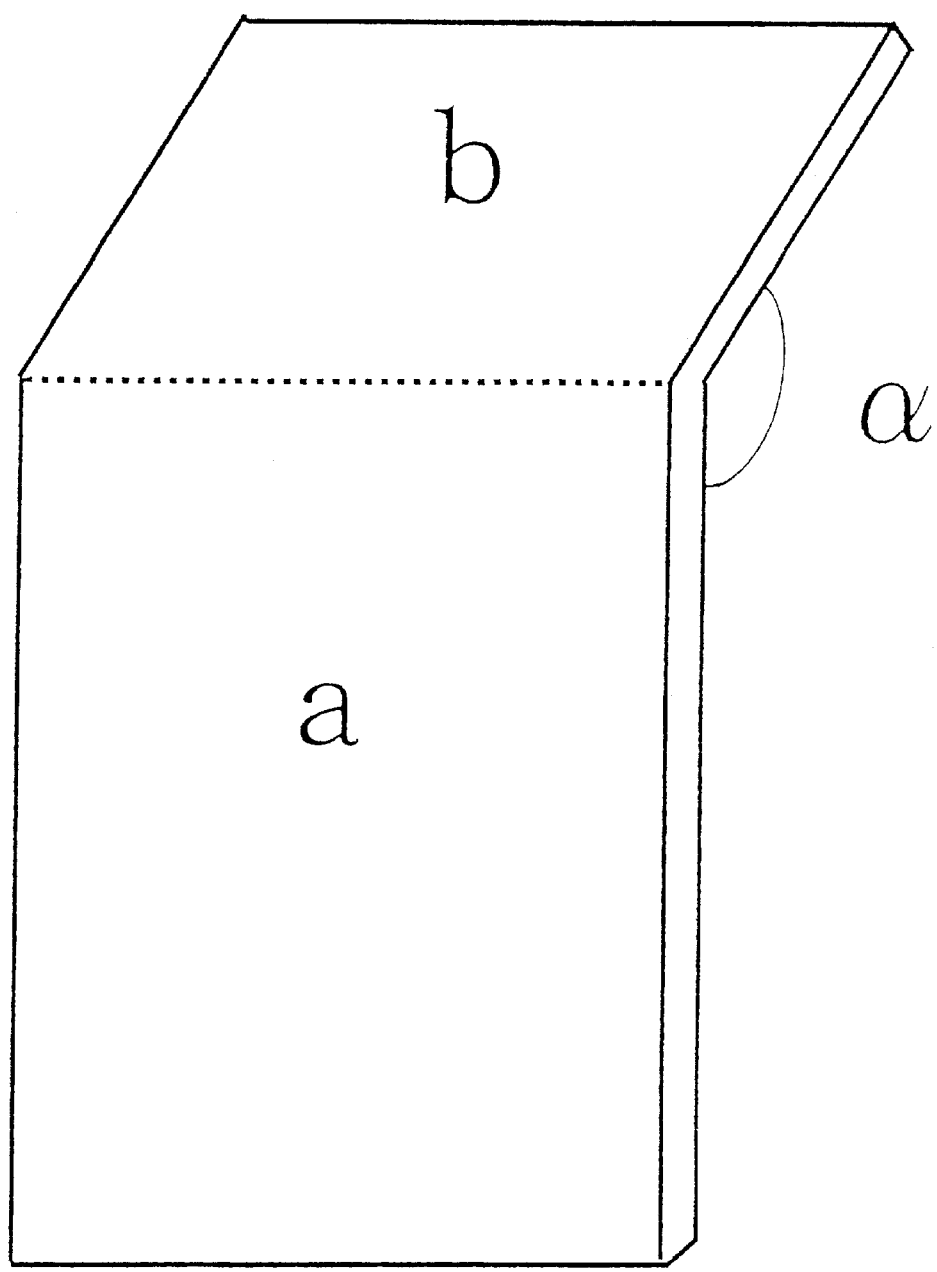
FIG. 1 is a schematic diagram showing a shape of an aluminum plate used for evaluation of the rain-striped contamination resistance of the coat.

a: Vertical surface during exposure b: Top surface during exposure

α: Folding angle (135°)

BEST MODE FOR CARRYING OUT THE INVENTION

The following embodiments further illustrate the present invention in detail.

The raw compounds used in the anti-contamination coating composition of the present invention are as follows.

(i) Polyurethane-forming Material (PU-I, PU-II, PU-III)

(i-1) Polyol Compound (A1)

The polyol in the present invention means a polyol which is generally used in the polyurethane technical field, particularly the technical field of polyurethane resin coating, and can be a coat-forming element in the anti-contamination coat formed from an anti-contamination coating composition by mixing with a polyisocyanate compound as a curing agent, followed by the reaction.

Such a polyol includes polyether polyol, polyester polyol, acrylic polyol or the like. The respective polyols are shown below.

① Polyether polyol

Examples of the polyether polyol include polyols obtained by adding one or more kinds of propylene oxide, ethylene oxide, butylene oxide, styrene oxide and the like to one or more kinds of polyhydric alcohols such as ethylene glycol, diethylene glycol, propylene glycol, dipropylene glycol, glycerin, trimethylolpropane, pentaerythritol, glucose, sorbitol, sucrose and the like; and polyoxytetramethylene polyols obtained by adding tetrahydrofuran to the above polyhydric alcohol by ring opening polymerization.

② Polyester polyol

Examples of the polyester polyol include polyols, for example, condensed polymers of one or more kinds of low-molecular weight of polyhydric alcohols such as ethylene glycol, propylene glycol, butane diol, pentane diol, hexane diol, cyclohexane dimethanol, glyceline, trimethylol propane, pentaerythlytol and the like and one or more kinds of glutalic acid, adipic acid, pimelic acid, suberic acid, sebacic acid, telephthalic acid, isophthalic acid, dimer acid, hydrogenated dimer acid, or other low-molecular weight of dicarboxylic acids or oligomer acids etc.; and ring opening polymers of ring opening esters such as propiolactone, caprolactone, valerolactone and the like.

③ Acrylic polyol

Acrylic polyol is obtained by copolymerizing a monomer having a hydroxyl group with an acrylic monomer and, if necessary, other monomers. Those having a hydroxyl group can be used without being specifically limited.

Examples of the monomer having a hydroxyl group include the following:

hydroxyalkyl esters of acrylic acid or same hydroxyalkyl esters of methacrylic acid: β-hydroxyethyl acrylate, β-hydroxypropyl acrylate, 3-hydroxypropyl acrylate, β-hydroxybutyl acrylate, 4-hydroxybutyl acrylate, β-hydroxypentyl acrylate, and the like;

acrylate or methacrylate monoesters of polyhydric alcohols such as glycerin, trimethylolpropane and the like; and N-methylolacrylamide, N-methylolmethacrylamide, allyl alcohols and the like.

Examples of the acrylic monomer which is copolymerized with the above hydroxyl group-containing monomer include the followings:

acrylic monomers: methyl acrylate, ethyl acrylate, n-propyl acrylate, isopropyl acrylate, n-butyl acrylate, isobutyl acrylate, t-butyl acrylate, 2-ethylhexyl acrylate, methyl methacrylate, ethyl methacrylate, n-propyl methacrylate, isopropyl methacrylate, n-butyl methacrylate, isobutyl methacrylate, t-butyl methacrylate, n-hexyl methacrylate, n-octyl methacrylate, n-dodecyl methacrylate, lauryl methacrylate and the like; and other monomers: styrene, vinyl acetate, acrylonitrile, acrylic acid, methacrylic acid, maleic acid, itaconic acid, acrylamide, glycidyl methacrylate, VeoVa, vinyl chloride, vinylidene chloride and the like.

Among the above monomers, use of methyl acrylate, ethyl acrylate, butyl acrylate, 2-ethylhexyl methacrylate, methyl acrylate, ethyl methacrylate, butyl methacrylate, lauryl methacrylate, acrylic acid, methacrylic acid, styrene, acrylamide, vinyl acetate and the like are particularly preferable.

④ Other polyols

In addition, phenol resin polyol, epoxy polyol, polybutadiene polyol, polyisoprene polyol, polyester-polyether polyol, polymer polyol, which is obtained by vinyl addition or dispersion of polymers of acrylonitrile and styrene, ureadispersed polyol and carbonate polyol can be used as the polyol of the present invention.

Among them, acrylic polyol is preferably used when the weathering resistance of the anti-contamination coat formed from the composition of the present invention is taken in consideration.

⑤ Fluorine-containing copolymer

The fluorine-containing copolymer in the present invention refers to those obtained by copolymerizing fluoroolefin, at least one of vinyl ester and vinyl ether, and a hydroxyl group-containing monomer as an essential constituent component. The fluoroolefin, vinyl ester, and vinyl ether include the following compounds.

⑤-a Fluoroolefin

Preferred examples of the fluoroolefin used in the present invention include perfluoroolefins such as tetrafluoroethylene, chlorotrifluoroethylene, hexafluoropropylene and the like; vinyl fluoride and vinylidene fluoride.

⑤-b Vinyl ester

As a vinyl ester to be copolymerized with the above fluoroolefin in the present invention, commercially available ones can be generally used, but Veova-9, a neononanoic acid ethenyl ester, and Veova-10, a neodecanoic acid ethenyl ester, which may alternatively be referred to as vinyl neodecanoate, (manufactured by Shell Chemical Co.) are preferable in view of the price and characteristics. In addition, vinyl acetate, vinyl propionate, vinyl butyrate and vinyl pivalate can be used.

⑤-c Vinyl ether

Examples of the vinyl ether used in the present invention include alkyl vinyl ethers, monomers having a glycidyl group, such as glycidyl vinyl ethers and the like. Monomers carboxylated by reacting hydroxyvinyl ether with anhydrous dibasic acid may also be used. Furthermore, a monomer such as tetrafluoro vinyl ether and vinyl ether having an amino group, can also be used. Vinyl ether having two or more vinyl groups can be optionally used.

⑤-d Hydroxyl group-containing monomer

As the monomer to be copolymerized to impart a hydroxyl group to a fluorine-containing polymer, the monomers exemplified in the section of the above acrylic polyol can be used.

⑤-e Optional copolymerizable monomers

In addition to the above essential components, the monomers exemplified in the section of above acrylic polyol can be used as an optional copolymerizable monomer.

The above fluorine-containing copolymer has a hydroxyl group, but a part of the hydroxyl group may be carboxylated with an anhydrous dibasic acid after a polymer is formed. Moreover, this fluorine-containing polymer may be used after mixing with other materials such as acrylic resin, polyester resin, acrylic polyol resin, polyester polyol resin and the like.

As the fluorine-containing copolymer of the present invention (A'), those having a number average molecular weight of 3000 to 30,000, a fluorine content of 10 to 30% by weight, a hydroxyl group value of 30 to 100 KOH mg/g and a glass transition temperature of 0 to 70° C., which is soluble in solvent, is preferably used.

When the number average molecular weight is smaller than 3000, the reactivity with a curing agent is poor and various physical properties of the coat are poor. On the other hand, when it is larger than 30,000, the compatibility with a polyalkyleneoxide chain-containing hydrophilic alkoxysilane compound or a tetraalkoxysilane condensate are poor, unfavorably.

When the fluorine content is smaller than 10% by weight, the weathering resistance of the resulting coat is insufficient. On the other hand, when it is larger than 30% by weight, the curing property and flexibility of the coat are poor and high gloss value cannot be obtained, unfavorably.

On the other hand, when the hydroxyl group value is smaller than 30 KOH mg/g, the physical properties of the coat and contamination resistance are poor because of low crosslink density. On the other hand, when it is larger than 100 KOH mg/g, the durability is lowered because shrinkage upon curing by the crosslinking reaction becomes larger.

In addition, when the glass transition temperature is lower than 0° C., the surface hardness is insufficient to cause physical adhesion of contaminants so that eternal contamination, which can not be washed, is formed. On the other hand, when it is higher than 70° C., it is not preferred because the flexibility of the coat is poor and crack occurs with a lapse of time.

(i-2) Polyol Compounds (A2)

The component (A2) is being dissolved or dispersed in a non-aqueous solvent, so they can be classified into two classes; those being dissolved as a dissolving type polyol and those being dispersed as a non-aqueous dispersion type (hereinafter referred to as "NAD type") polyol.

① Dissolving type polyols

The dissolving type polyol is that capable of dissolving in a non-aqueous solvent, and specifically polyol having two or more hydroxyl groups in the molecule, and examples thereof include alkyd polyol, acrylic polyol, acrylated alkyd polyol, polyester polyol or polybutadiene oligomer and the like.

The form of the polyol, which is suitable to be dissolved in the non-aqueous solvent and has SP of 6.5 to 9.5, include alkyd polyol having an oil length of not less than 40%, alkyl polyol containing a raw material having high affinity for a solvent such as p-t-butyl benzoate, and acrylic polyol containing raw materials having high affinity for a solvent having weak dissolving force, such as isobutyl methacrylate, 2-ethylhexyl methacrylate or the like.

② NAD type polyol

The NAD type polyol is dispersed as a resin particle in a non-aqueous solvent, and has a resin portion, which is soluble in the non-aqueous solvent, and a resin portion, which is insoluble in the non-aqueous solvent.

The resin portion, which is soluble in the non-aqueous solvent, is that having a solubility of not less than 99.0% by weight. This solubility varies depending on the kind of the non-aqueous solvent so that the resin portion may be those, which are soluble in the non-aqueous solvent to be dispersed finally.

To the contrary, the resin portion, which is insoluble in the non-aqueous solvent may be those, which are hardly dissolved in the non-aqueous solvent or slightly soluble in a very small amount (e.g. having solubility is less than 1.0% by weight). This also varies depending on the kind of the non-aqueous solvent so that those, which are hardly dissolved in the non-aqueous solvent to be dispersed finally, are used.

Specific examples thereof include NAD type polyol wherein an acrylic polyol is used as the resin portion capable of dissolving.

In the present invention, dissolving type polyols or NAD type polyols can be used alone or in combination thereof as the component (A2).

As the component (A2), those having SP of 6.5 to 9.5 are used. By using those having such SP, it is possible to be dissolved and/or dispersed in a solvent having weak solubility, which is referred to as a weak solvent, and a weak solvent type coating can be provided. As a matter of course, the component can also be used after dissolving in a strong solvent having strong dissolving force.

(i-3) Polyisocyanate Compound

① Polyisocyanate compound (B-1)

In the present invention, an anti-contamination coat is formed by mixing a polyisocyanate compound, followed by curing by crosslinking. The polyisocyanate compound (B1) used in (PU-I) or (PU-III) includes the following:

polyisocyanate compounds obtained by allophanation, burettization, dimerization (urethidionation), trimerization (isocyanuration), adduction or carbodiimide reaction of isocyanate monomers such as toluene diisocyanate (TDI), 4,4-diphenylmethane diisocyanate (pure-MDI), polymeric MDI, xylylene diisocyanate (XDI), hexamethylene diisocyanate (HMDI), isophorone diisocyanate (IPDI), hydrogenated XDI, hydrogenated MDI and the like, and mixtures thereof.

It is preferred to use aliphatic or alicyclic polyisocyanates or mixtures thereof considering yellowing of the formed coat.

Similar to the polyurethane resin coating which is generally used, the coating composition of the present invention is preferably a two component type coating comprising a component having a NCO group and a component having a hydroxyl group, and these plural components are mixed in a predetermined amount just before use.

Furthermore, these polyisocyanates can be used in the form of a blocked isocyanate using a blocking agent such as alcohols, phenols, ε-caprolactams, oximes, activated methylene compounds. It is preferable to use these polyisocyanates as a solution of a solvent containing no activated hydrogen.

In the case of using the above blocked isocyanate compounds, the respective components of the anti-contamination coating composition can be combined to form one package. When this one package type coating is used, NCO can be produced by leaving a blocking agent with heating, etc., after coating and then coating can be crosslinked and cured. In this case, the catalyst is preferably used in order to facilitate the reaction of an isocyanate group and a hydroxyl group.

The polyisocyanate compounds (B2) may be used by selecting those having a concentration of an isocyanate group of 3 to 15% by weight in solid content from the above compounds.

In the system containing (PU-I), (PU-III) as the base, mixing of these polyisocyanates, polyol compounds and fluorine-containing copolymers is carried out in the proportion of 0.6 to 1.4, more preferable 0.8 to 1.2 in terms of a NCO/OH equivalent ratio (equivalent ratio of isocyanate group to hydroxyl group). When the NCO/OH equivalent ratio is smaller than the lower limit of the above range, the curing properties and durability of the coat are lowered and, at the same time, the so-called contamination recovery, i.e., effect of washing out contamination is lowered and the stain resistance becomes insufficient. To the contrary, when the NCO/OH equivalent ratio exceeds the above range, excess NCO is reacted with water to evolve $CO_2$ and bubbles are formed in the coat. Therefore, the finish feeling is lowered or initial dryness is deteriorated so that the initial anti-contamination performance is lowered. Within the range of 0.8 to 1.2, a stable coat can be obtained even if a change in the kind of material used and variation in rots arise. Therefore, the coating shows good elasticity.

② Polyisocyanate compound (B2)

As the isocyanate compound (B2) used in the (PU-II)-based coating composition, those referred to as an isocyanate curing agent are generally suitable and an anti-contamination coat is formed by crosslinking curing.

Such a curing agent includes alkyl polyisocyanates available under the trade names Barnoc DN-990, Barnoc DN-991, Barnoc DN-992 (manufactured by Dainippon Ink Chemical Industries Co., Ltd.), the alkyl polyisocyanates available under the trade name Duranate TSA (manufactured by Asahikasei Industries Co., Ltd.), the alkyl polyisocyanates available under the trade name Takenate D-177 N (manufactured by Takeda Chemical Industries Co., Ltd.), the alkyl polyisocyanates available under the trade name Desmodule Z-4270 (manufactured by Sumitomo Beyer Urethane Co., Ltd.) or the like. These curing agents can be suitably used because they are also soluble in a solvent having weak solubility.

It is also possible to use those obtained by allophanation, burettion, dimerization (urethidionation), trimerization (isocyanuration), adduction and carbodiimidation reactions of isocyanate monomers such as toluene diisocyanate (TDI), 4,4-diphenylmethane diisocyanate (pure-MDI), polymeric MDI, xylylene diisocyanate (XDI), hexamethylene diisocyanate (HMDI), isophorone diisocyanate (IPDI), hydrogenated XDI, hydrogenated MDI and the like, and mixtures thereof after dissolving in a solvent having strong dissolving force. It is also suitable to use (PU-II) base after dissolving in a weak solvent, similar to the polyol compound.

In the system of (PU-II), the NCO/OH equivalent ratio is preferably within the range from 0.7 to 2.0, and more preferably from 0.9 to 1.4. The reason is the same as that in case of (PU-I).

(ii) Tetraalkoxysilane Condensates (C1), (C2)

The tetraalkoxysilane condensate (C1) used in the present invention is a tetraalkoxysilane condensate having an average condensation degree of 4 to 20, and the condensate is characterized by having an alkyl group having 1 to 2 carbon atoms and an alkyl group having 3 to 10 carbon atoms, the proportion of the alkyl group having 3 to 10 carbon atoms being from 5 to 50 equivalent % based on the total alkyl group in the condensate. Furthermore, the tetraalkoxysilane condensate (C2) is a tetraalkoxysilane condensate having an average condensation degree of 4 to 20, and the condensate is characterized by having an alkyl group having 1 to 3 carbon atoms and an alkyl group having 4 to 12 carbon atoms, the proportion of the alkyl group having 4 to 12 carbon atoms being from 5 to 50 equivalent % based on the total alkyl group in the condensate.

With regard to the above-mentioned condensates, those having a high degree of condensation (those having an average condensation degree of more than 20) and those having high molecular weight are not preferred because it is difficult to produce them and handling of them is inconvenient due to an increase in viscosity. To the contrary, those having an average condensation degree of not more than 3 and low molecular weight are not preferred because the volatility becomes higher and the handling is inconvenient.

When the portion of the alkyl group of the above condensate is only composed of an alkyl group of 1 to 2 carbon atoms (alkyl group having 1 to 3 carbon atoms in the case of (C2)), the surface orientation property is insufficient and the contamination resistance is not satisfactory. When it is composed of only an alkyl group having 3 to 10 carbon atoms, it becomes difficult to cause hydrolysis and the anti-contamination effect becomes poor, unsatisfactory. When the alkyl group having 11 or more carbon atoms (13 or more carbon atoms in the case of (C2))exists, the contamination resistance is lowered, unfavorably. The larger the number of carbon atoms of the alkyl group is, the lower a tendency to cause the above hydrolysis reaction becomes so that existence of only an alkyl group having large number of carbon atoms is unfavorable.

The alkoxysilane condensates (C1), (C2) of the present invention can be prepared by the method described in the following ①, ② using at least one tetraalkoxysilane as the raw material, but the method is not limited thereto. Consequently, it is preferred that the resulting condensate contains from 5 to 50 equivalent % of the alkyl group having 3 to 10 carbon atoms (alkyl group having 4 to 12 carbon atoms in case of (C2)) and has a weight-average molecular weight of 250 to 3500. (C1) and (C2) are selected by testing characteristics of resin bases and the compatibility with resin bases.

(ii-①) Method of condensing a tetraalkoxysilane having one and more kinds of alkyl groups having 1 or 2 carbon atoms (alkyl group having 1 to 3 carbon atoms in case of (C2)) and a tetraalkoxysilane having one or more kinds of alkyl groups having 3 or 10 carbon atoms (alkyl group having 4 to 12 carbon atoms in case of (C2)), or a tetraalkoxysilane having one or more kinds of alkyl groups having 1 or 2 carbon atoms (alkyl group having 1 to 3 carbon atoms in the case of (C2)) and a tetraalkoxysilane having one or more kinds of alkyl groups having 3 or 10 carbon atoms (alkyl group having 4 to 12 carbon atoms in the case of (C2)) as the raw material.

Specific examples of the hydrophilic alkoxysilane compound containing an alkyl group having 3 to 10 carbon atoms (alkyl group having 1 to 3 carbon atoms in case of (C2)) used as the raw material for preparing the tetraalkoxysilane condensate of the present invention include condensates such as monobutoxytrimethoxysilane, monopropoxytrimethoxysilane, monopentoxytrimethoxysilane, monohexoxy-trimethoxysilane, dibutoxydiethoxysilane and the like (in case of (C2), monopropoxytrimethoxysilane is omitted and dodecoxytrimethoxysilane can be used), but are not limited thereto.

The tetraalkoxysilanes having 1 or 2 carbon atoms include tetramethoxysilane, tetraethoxysilane and the like (monopropoxytrimethoxysilane can be used in case of (C2)).

(ii-②) Method of condensing one or more tetraalkoxysilanes so that the average condensation degree becomes 4 to 20 by using a publicly known method to obtain a condensate (component (a)) and performing the ester interchange reaction between the condensate and an alcohol having an alkyl group which is different from that of an alkoxysilane as the raw material.

It can also be performed by the method of ester-interchanging about 5 to 50% of an alkyl group portion of the component (a) by using an alcohol (component (b)) containing an alkyl group having 3 to 10 carbon atoms (alkyl group having 4 to 12 carbon atoms in case of (C2)).

Specific examples of the component (a) include condensates of tetramethylsilicate, tetraethylsilicate and the like.

It is preferred that the average condensation degree is from 4 to 20 and the weight-average molecular weight is about from 500 to 3500. When the average condensation degree is too large or too small, the handling becomes inconvenient, unfavorably.

Specific examples of the component (b) include n-propyl alcohol (excluded in case of (C2)), n-butyl alcohol, n-amyl alcohol, n-hexyl alcohol, n-heptyl alcohol, n-octyl alcohol, n-nonyl alcohol, n-decyl alcohol and the like (dodecyl alcohol also can be used in case of (C2)), and the component (b) may be alcohols having a branched carbon chain.

When the component (a) is ester-interchanged with the component (b), all alkyl groups (R5) of the component (a) are not ester-interchanged with the alkyl groups (R6) of the component (b), but about 5 to 50% of all alkyl groups of the component (a) is ester-interchanged.

This interchange ratio is appropriately adjusted with an average condensation degree of the component (a), but it is possible to prepare those, wherein the contamination resistance of the coat is excellent, by ester interchange of about 5 to 50% of all alkyl groups of the component (a). The lower this ester interchange ratio, the more the contamination resistance is lowered. When the ester interchange ratio becomes higher, the hydrolysis reaction hardly arises and the coat is hardly hydrophilized. Therefore, the stain resistance is liable to be lowered.

The above tetraalkoxysilane condensate (C1) is contained in the amount of 1.0 to 40.0 parts by weight, and preferably 2.0 to 30.0 parts by weight in term of $SiO_2$ relative to 100 parts by weight of the solid content of the polyol compound or fluorine-containing copolymer.

The reason is as follows. That is, when the amount is less than 1.0% by weight, the hydrophilicity of the coat is not sufficient and, therefore, the contamination resistance is poor. On the other hand, when the amount exceeds 40.0 parts by weight, there arise problems such as deterioration of appearance of the cured coat and crack. When it is contained in the amount of 2.0 to 30.0 parts by weight, an influence of the composition of the material is small and stable characteristics can be obtained.

The value in terms of $SiO_2$ in the present invention means a weight obtained in the case that all of Si contained in the above alkoxysilanes are converted into $SiO_2$. Actual calculation was performed by measuring a residual amount (% by weight) of silica ($SiO_2$), which is obtained by completely hydrolyzing the compound having a Si—O bind, such as alkoxysilane and silicate, followed by calcination at 900° C., and calculating by the following equation:

[Value in term of $SiO_2$]=[X]×[Residual amount of silica]

where [X] is an amount of an alkoxysilane condensate added.

(iii) Alkylene Oxide Chain-containing Hydrophilic Alkoxysilane Compound (D)

To the anti-contamination composition of the present invention, a hydrophilic alkoxysilane compound containing an alkylene oxide chain may be added. This is because the coat becomes more hydrophilious and excellent effect of contamination resistance is obtained by using in combination with the alkoxysilane condensate (C1). Moreover, by using in combination, it is possible to obtain an anti-contamination coating composition which is superior in stain resistance of the coat.

The hydrophilic alkoxysilane compound (D) is a compound having a repeating unit of an alkylene oxide group and at least one alkoxysilyl group.

In the repeating unit of the alkylene oxide group, the number of carbon atoms of the alkylene portion is from 2 to 4 and the repeating unit is from 2 to 40, and preferably from 2 to 20.

The hydrophilic alkoxysilane compound (D) may have an alkoxysilyl group at both terminals, or may have an alkoxysilyl group at one terminal and other functional group at the other terminal. The functional group, which can be present at one terminal, includes vinyl group, hydroxyl group, epoxy group, amino group, isocyanate group, mercapt group or the like. The functional group may be those which are combined with an alkoxysilyl group via an urethane bond, an urea bond, a siloxane bond, an amide bond, or the like.

As the hydrophilic alkoxysilane compound (D), those obtained by reacting a polyalkylene oxide chain-containing compound with an alkoxysilyl group-containing compound (hereinafter referred to as a "coupling agent") can be used.

The above polyalkylene oxide chain-containing compound preferably has a molecular weight of 150 to 3500, and more preferably 200 to 1500. When the molecular weight is less than 100, the hydrophilicity of the cured coat is poor and the washing effect of the contaminant by rainfall can not be obtained. When the molecular weight exceeds 3500, the water resistance and hardness of the coat are lowered. When the molecular weight is from 200 to 1500, an influence of the material characteristics is hardly exerted and the stable characteristics are obtained.

Examples of the polyalkylene oxide chain-containing compound include polyethylene glycol, polyethylene-propylene glycol, polyethylene-tetramethylene glycol, polyethylene glycol diglycidyl ether, polypropylene glycol diglycidyl ether, polyoxyethylene diglycolic acid, polyethlene glycol vinyl ether, polyethylene glycol divinyl ether, polyethylene glycol acryl ether, polyethylene glycol diallyl ether or the like. The polyalkylene oxide chain-containing compound can be selected from the combination of one or more kinds.

On the other hand, the above coupling agent used in the synthesis of the polyalkylene oxide chain-containing hydrophilic alkoxysilane compound is a compound having at least one alkoxysilyl group and other substituents. Specific examples of the coupling agent include β-(3,4-epoxycyclohexyl)ethyltrimethoxysilane, γ-glycidoxypropylmethyldiethoxysilane, γ-glycidoxypropyltriethoxysilane, N-β-(aminoethyl) γ-aminopropylmethyldimethoxy-silane, N-β-(aminoethyl) γ-aminopropylmethyltrimethoxysilane, γ-aminopropyltrimethoxysilane, γ-aminopropyltriethoxysilane, isocyanate functional silane, γ-methacryloxypropyltrimethoxysilane, γ-methacryloxypropylmethyldiethoxysilane, γ-methacryloxypropyltriethoxysilane and the like.

Synthesis of the polyalkylene oxide chain-containing hydrophilic alkoxysilane compound (D) is not specifically limited, but it can be synthesized by a publicly known method such as method of preparing a polyalkylene oxide chain-containing compound and a coupling agent, separately, and copolymerizing each compound using a radical polymerization initiator when having a polymerizable double bond and method of using the addition reaction of an amino group/an epoxy group, an isocyanate group/a hydroxyl group or an isocyanate group/an amino group. It is also synthesized by the method of ring opening addition of ethylene oxide to an alkoxysilyl compound having active hydrogen group such as primary or secondary amino group. Hereinafter, the synthesis means will be described.

Regarding the synthesis method of a polyalkylene oxide chain-containing hydrophilic alkoxysilane compound, in case of copolymerizing using a radical polymerization initiator, the compound can be obtained by reacting at least one polyalkylene oxide chain-containing compound having a polymeric double bond with at least one coupling agent in a suitable non-reactive solvent. In this case, the used radical polymerization initiators include perester compounds such as benzoyl peroxide, dichlorobenzoyl peroxide, 2,5-di(peroxybenzoate)hexine-3,1,3-bis(t-butylperoxyisopropyl) benzene, t-butyl perbenzoate and the like; azo compounds such as azobisisobutylonitrile, dimethylazobutylate and the like; and organic peroxides. As the polyalkylene oxide chain-containing compounds having a polymeric double bond, for example, a polyethyleneglycol vinyl ether can be used. As the coupling agent, γ-methacryloxypropyltrimethoxysilane, γ-methacryloxypropylmethyldiethoxysilane and γ-methacryloxypropyltriethoxysilane can be used alone or in combination thereof.

When it is synthesized by the addition reaction of isocyanate/polyol, it is synthesized by mixing a compound having a hydroxyl group at the terminal, such as polyethylene glycol, as a polyalkylene oxide chain-containing compound, and a compound having an isocyanate group such as isocyanate-containing coupling agent as a coupling agent. In this synthesis method, it is possible to use a reactive catalyst such as dibutyl tin dilaurate, dibutyl tin dimalate or dioctyl tin dimalate.

As the polyalkylene oxide chain-containing hydrophilic alkoxysilane compound (D) synthesized by the above reaction, those obtained by adding a coupling agent at both terminals of the polyalkylene oxide chain-containing compound can be obtained, but these compounds can be used alone or in combination thereof.

Among these polyalkylene oxide chain-containing hydrophilic alkoxysilane compounds, those wherein a polyalkylene oxide chain is an ethylene oxide chain and one terminal is a hydroxyl group are most preferable because the anti-contamination effect of the present invention, i.e. contamination resistance and stain resistance are excellent.

The mixing proportion of the hydrophilic alkoxysilane compound (D) is from 0.1 to 20 parts by weight, and preferably 0.2 to 10 parts by weight, in terms of the solid content relative to 100 parts by weight of each resin solid content of the polyol compound (A1) in case of (PU-I), (PU-III), the polyol compound (A2) in case of (PU-II), and the acrylic copolymer resin (AC) in case of the acrylic copolymer resin (AC). When it is less than 0.1 parts by weight, the effect is not obtained, unfavorably. When it exceeds 20 parts by weight, the compatibility with the resin and the water resistance of the cured article are poor, unfavorably.

(iv) Amine Compound (E)

(iv-①) The anti-contamination coating composition of the present invention is capable of enhancing the interlaminar adhesion of the formed coat by adding the amine compound (E), thereby making it possible to improve the recoating property. As a result, a firm anti-contamination coat having excellent durability can be obtained.

Examples of the amine compound which can be added for this purpose include the following compounds:

primary and secondary amines: ethylamine, dimethylamine, diamylamine, cyclohexylamine, aniline, hexamethylenediamine, ethylenediamine, triethylenediamine and the like;

tertiary amine: trimethylamine, triethylamine, N-methylmorpholine or the like;

alkanolamine: ethanolamine, diethanolamine, triethanolamine, ethylphenyl-ethanolamine or the like.

other amines: pyridine, morpholine, caprolactum and the like; and aminosilanes: aminomethyltriethoxysilane, aminomethyldiethoxysilane, n-tri-methoxysilylpropyl-ethylenediamine, γ-phenylaminopropyltrimethoxysilane, γ-aminoisopropyltrimethoxysilane, γ-aminoisobutyltrimethoxysilane, γ-aminopropyl-methyldiethoxysilane and the like.

Among the above amine compounds, the tertiary amine compounds can be used, most preferably. Among the tertiary amine compounds, the tertiary amine compounds having the same or different functional group selected from alkyl group having 1 to 5 carbon atoms, alkanol group having 1 to 5 carbon atoms, aminoalkyl group having 1 to 5 carbon atoms and alkoxysilyl group-containing alkyl group having 1 to 5 carbon atoms are particularly preferable. The reason is that, when amine compounds are primary amine and secondary amine, a NH group is present and the hydrogen atom is active and is liable to react with a NCO group of the isocyanate. When the NH group and NCO group react each other, an urea bond is formed but the production rate of the urea bond obtained by the reaction of the NH group and NCO group is faster than that of the urethane bond obtained by reacting the OH group and NCO group. Accordingly, the presence of the NH group inhibits production reaction of the urethane bond, and exerts some influence on the properties of the coat. However, even if the NH group was present, no problem arises actually considering the addition amount of the amine compound.

The mixing rate of amine compound (E) is 0.02 to 5.0 parts by weight, and preferably 0.05 to 2.0 parts by weight, relative to 100 parts by weight of resin solid content of the polyol compound (A1) in case of (PU-I) and (PU-III), the polyol compound (A2) in case of (PU-II), and the acryl copolymer resin (AC) in case of the acryl copolymer resin (AC). When the amount of the amine compound is less than 0.02 parts by weight, the effect can not be obtained, unfavorably. On the other hand, when the amount exceeds 5.0 parts by weight, the weathering resistance of the coat is lowered, resulting in lack of practical use.

This amine compound (E) may be handled similar to normal raw materials for coating, and may be added before dispersing in case of a solid, and before dispersing or on dissolving after dispersion in case of a liquid.

(iv-②) Tertiary Amino Group-containing Polyolacrylpolyol

In the anti-contamination coating composition of the present invention, the above polyol (A1) and fluorine-containing copolymer can be used, but the recoating property can also be improved by using a tertiary amino group-containing acrylpolyol or a tertiary amino group and fluorine-containing copolymer in place of adding the amine compound (E). The presence of tertiary amino group gives the same effect as that obtained by adding an amine compound.

As a tertiary amino group-containing acrylic polyol used with or instead of the polyol compound (A1), those containing a tertiary amino group can be used among the acrylic polyols used normally in the technology field of polyurethane. Such acrylic polyols include hydroxyl group-containing acrylate ester or methacrylate ester, polymeric unsaturated bond-containing tertiary amine compound, and copolymer of these and a copolymerizable monomer.

As such hydrogen-containing acrylate or methacrylate, the compounds described in the item of the acrylic polyol can be used.

On the other hand, examples of the tertiary amine-containing monomer containing a polymeric unsaturated bond include 2-(N, dimethylamino)ethylmethacrylate, 2-(N, N-dimethylamino)ethylacrylate and the like.

Among them, particularly preferred is 2-(N,N-dimethylamino)ethyl methacryl ate.

Similarly, as the other monomer capable of copolymerizing with acrylate ester or methacrylate ester containing above hydroxyl group, the compounds described in the item of the acrylic polyol can be used.

Among them, methyl acrylate, ethyl acrylate, butyl acrylate, methyl methacrylate, butyl methacrylate, lauryl methacrylate, acrylic acid, methacrylic acid, styrene, acrylamide, vinyl acetate, etc., are particularly preferable.

In place of the fluorine-containing copolymer described above, or as the tertiary amino group and fluorine-containing copolymer with the fluorine-containing copolymer, those containing tertiary amino group are used, among normally used fluorine-containing copolymers in the technology field of the fluorine resin.

Such a fluorine-containing copolymer is prepared by copolymerizing a fluorine monomer and a copolymerizable monomer, which are basic constituent monomers, with a hydroxyl group-containing acrylate or methacrylate and a tertiary amine-containing monomer containing a polymerizable unsaturated bond. As the fluorine-containing monomer used in this copolymerization, general fluorine-containing monomers used in the above fluorine-containing copolymer can be used.

As the copolymerizable monomer, the above vinyl ether, vinyl ester and acrylate monomer can be used. As the hydroxyl group-containing acrylate or methacrylate and tertiary amine-containing monomer containing polymeric unsaturated bond, the monomers described in the preparation of the above tertiary amino group-containing acrylic polyol can be used.

(v) Acrylic Copolymer Resin (AC)

The acrylic copolymer resin (AC) of the present invention contains an acrylate and/or methacrylate monomer, and an acrylic copolymer resin having a glass transition temperature of 0 to 100° C. is used.

As the component (AC), those obtained by appropriately selecting from the monomers described as the raw material of the above acrylic polyol, and copolymerizing them, and then dissolving and/or dispersing the resulting copolymer in a non-aqueous solvent, are used. At this time, selection of monomers is carried out so that at least one of selected monomers is an acrylate and/or methacrylate monomer.

As the non-aqueous solvent which dissolves and/or disperses the component (AC), general organic solvents can be used, and examples thereof include aliphatic hydrocarbon solvent, aromatic hydrocarbon solvent, ester, ketone and the like.

One or more non-aqueous solvents may be used alone or in combination.

As the component (AC), those having a glass transition temperature of 0 to 100° C. are used, among the above acrylic copolymer resins.

When the glass transition temperature is not more than 0° C., stickiness of the coat surface referred to as "tack" occurs and physical adhesion of contaminant occurs so that the anti-contamination property disappears, unfavorably. To the contrary, when the glass transition temperature is larger than 100° C., the hardness of the formed coat becomes higher so that crazing referred to as "crack" occurs with a lapse of time, unfavorably.

When the alkyl groups in the component (C1) to be added in the coating containing the component (AC) as a base include alkyl groups having 1 to 2 carbon atoms and alkyl groups 3 to 10 carbon atoms, the surface orientation property becomes good and it is possible to obtain excellent anti-contamination effect even in case of smaller addition amount. An effect of preventing the anti-contamination coat of the present invention from becoming too hard can be obtained by reducing the amount of the component (C1). Furthermore, it became possible to produce a coating at a cheaper price.

The component (C1) thus prepared can be mixed in the amount 1 to 30 parts by weight, and preferably 3 to 10 parts by weight, in term of $SiO_2$ relative to 100 parts by weight of the solid content of the resin in the component (AC).

(vi) Acrylic Silicone Resin Base

Alkoxysilyl group-containing acrylic copolymer (AS) (hereinafter referred to as a component (AS)) as one component in the anti-contamination coating composition of the present invention is a polymer having at least one, preferably two or more alkoxysilyl groups represented by the general formula (Chemical Formula 1) in the molecule. This alkoxysilyl group may be contained in the terminal of the main chain or side chain of the molecule of the component (AS), and may be contained in both terminals. When the number of alkoxysilyl groups of the molecule of the component (AS) is less than 1, the solvent resistance of the cured article, i.e. coat obtained from the composition of the present invention tends to be lowered.

(Chemical Formula 1)

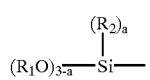

wherein $R_1$ represents an alkyl group having 1 to 10 carbon atoms; $R_2$ represents a hydrogen atom or a monovalent hydrocarbon group selected from the group consisting of alkyl, aryl and aralkyl groups having 1 to 10 carbon atoms; and a represents 0, 1 or 2.

In Chemical Formula 1, $R_1$ is an alkyl group having 1 to 10 carbon atoms, preferably 1 to 4 carbon atoms. When the number of carbon atoms of $R_1$ exceeds 10, the reactivity of the alkoxysilyl group is lowered. When $R_1$ is any group other than alkyl group, for example, phenyl group and benzyl group, the reactivity is also lowered.

Specific examples of the alkyl group represented by $R_1$ include methyl group, ethyl group, n-propyl group, isopropyl group, n-butyl group, isobutyl group and the like. In the above formula, $R_2$ is a hydrogen atom, or a monovalent hydrocarbon selected from the group consisting of alkyl, aryl and aralkyl groups having 1 to 10 carbon atoms, preferably 1 to 4 carbon atoms.

In the hydrocarbon groups represented by $R_2$, specific examples of the alkyl group include the same group as those for $R_1$, and specific examples of the aryl group include phenyl group, and specific examples of the aralkyl group include benzyl group.

Since the main chain of the component (AS) is substantially composed of an acrylic copolymer chain, the weathering resistance, chemical resistance and water resistance of the coat are excellent. In the component (AS), when the alkoxysilyl group is combined with a carbon atom, the water resistance of the resulting cured article becomes superior and the alkali resistance and acid resistance also become superior.

The number-average molecular weight of the component (AS) is preferably from 1000 to 50000, and more preferably from 3000 to 25000 in view of physical properties such as durability of the cured article obtained from the composition of the present invention.

The component (AS) can be obtained by copolymerizing an acrylic monomer such as acrylic acid, methacrylic acid and derivatives thereof with an alkoxysilyl group-containing monomer.

As the acrylic monomer, the monomer described as the acrylic polyol raw material can be used. The following monomers can also be used.

Stearyl (meth)acrylate, benzyl (meth)acrylate, cyclohexyl (meth)acrylate, trifluoroethyl (meth)acrylate, pentafluoropropyl (meth)acrylate, perfluorocyclohexyl (meth)acrylate, (meth)acrylonitrile, glycidyl (meth) acrylate, dimethylaminoethyl (meth)acrylate, diethylaminoethyl (meth)acrylate, methacrylamide, α-ethylmethacrylamide, N-butoxymethylmethacrylamide, N,N-dimethylacrylamide, acryloylmorphorine, N-methylolmethacrylamide and the like.

Phosphate group-containing vinyl compound which is a condensate with phosphoric acid or phosphates, (meth) acrylate containing an urethane bond and a siloxane bond or the like.

Furthermore, the above alkoxysilyl group-containing monomer is not specifically limited except for having a polymeric double bond, and specific examples thereof include:

(Chemical Formula 2)

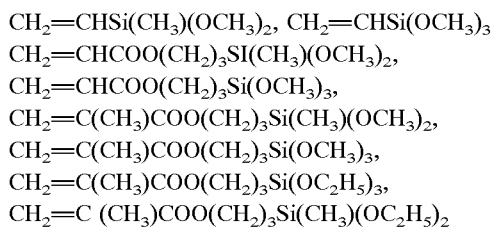

$CH_2$=$CHSi(CH_3)(OCH_3)_2$, $CH_2$=$CHSi(OCH_3)_3$
$CH_2$=$CHCOO(CH_2)_3SI(CH_3)(OCH_3)_2$,
$CH_2$=$CHCOO(CH_2)_3Si(OCH_3)_3$,
$CH_2$=$C(CH_3)COO(CH_2)_3Si(CH_3)(OCH_3)_2$,
$CH_2$=$C(CH_3)COO(CH_2)_3Si(OCH_3)_3$,
$CH_2$=$C(CH_3)COO(CH_2)_3Si(OC_2H_5)_3$,
$CH_2$=$C (CH_3)COO(CH_2)_3Si(CH_3)(OC_2H_5)_2$

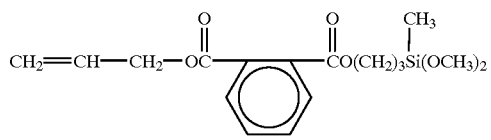

(Chemical Formula 3)

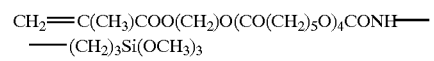

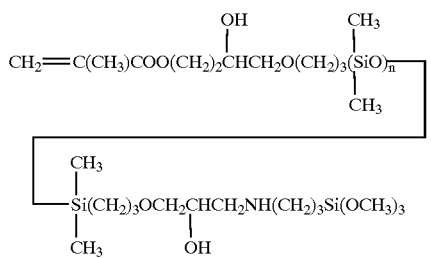

(n represents an integer of 1 to 11), and acrylates or methacrylates, containing an alkoxysilyl group at the terminal via a urethane bond or a siloxane bond.

The proportion of the alkoxysilyl group-containing monomer in the component (AS) is preferably from 5 to 90%, and more preferably from 10 to 70% in terms of the curing property of compositions and durability of the coat.

In the component (AS), a segment formed on the main chain through a urethane bond and a siloxane bond may be contained in the amount of less than 50%, and a segment derived from a monomer except for a methacrylic acid derivative may also be contained.

This monomer is not specifically limited and specific examples thereof include aromatic hydrocarbon vinyl compound such as styrene, α-methylstyrene, chlorostyrene, styrene sulfonic acid, 4-hydroxystyrene, vinyl toluene or the like; unsaturated carboxylic acid such as maleic acid, fumaric acid, itaconic acid or the like; salts thereof (alkali metal salt, ammonium salt, amine salt and the like); acid anhydrides thereof (maleic anhydride and the like); ester of unsaturated carboxylic acid such as diester or half ester of the above carboxylic acids and linear or branched alcohol having 1 to 20 carbon atoms; vinyl ester and allyl compound, such as vinyl acetate, vinyl propionate, diallyl phthalate or the like; amino group-containing vinyl compound such as vinyl pyridine, aminoethyl vinyl ether or the like; amide group-containing vinyl compound such as diamide itaconate, crotonamide, diamide malate, diamide fumarate, N-vinyl pyrrolidone or the like; and other vinyl compound such as 2-hydroxyethyl vinyl ether, methyl vinyl ether, cyclohexyl vinyl ether, vinyl chloride, vinylidene chloride, chloroprene, propylene, butadiene, isoprene, fluoroolefin maleimide, N-vinylimidazol, vinylsulfonic acid and the like.

The alkoxysilyl group-containing acrylic copolymer can be obtained by mixing at least one of these alkoxysilyl group-containing monomers and at least one radical polymerizable monomer in a suitable non-reactive solvent, and copolymerizing the mixture using a radical polymeric initiator.

Examples of the radical polymeric initiator include perester compound such as benzoyl peroxide, dichlorobenzoyl peroxide, 2,5-di(peroxibenzoate)hexine-3,1,3-bis(t-butylperoxiisopropyl)benzene, t-butylperbenzoate or the like; azo compound such as azobisisobutylonitrile, dimethylazobutylate or the like; and organic peroxide.

(vii) Catalyst for Hydrolysis and Condensation of Alkoxysilyl Group (H)

Specific examples of the component (H) used optionally in the present invention include the following compounds:

organotin compound: dibutyltin dilaurate, dibutyltin dimalate, dioctyltin dilaurate, dioctyltin dimalate, tin octylate or the like;

phosphoric acid phosphate: monomethyl phosphate, monoethyl phosphate, monobutyl phosphate, monooctyl phosphate, monodecyl phosphate, dimethyl phosphate, diethyl phosphate, dibutyl phosphate, dioctyl phosphate, didecyl phosphate or the like;

epoxy group-containing compound: propylene oxide, butylene oxide, cyclohexene oxide, glycidyl methacrylate, glycidol, acryl glycidyl ether, γ-glycidoxypropyl trimethoxysilane, γ-glycidoxypropyl triethoxysilane, γ-glycidoxypropyl methyldimethoxysilane or the like;

addition reaction product of an epoxy compound and phosphoric acid and/or mono acidic phosphate; and organic acid and acid anhydride: maleic acid, adipic acid, azelaic acid, sebacic acid, itaconic acid, citric acid, succinic acid, phtharic acid, trimellitic acid, pyromellitic acid and acid anhydrides thereof, p-toluenesulfonic acid or the like.

Furthermore, mixture of these acidic catalysts and amine, or reaction product thereof is also included. Examples thereof include amines such as hexylamine, N,N-dimethyldodecylamine, dodecylamine and the like. An organotin compound is preferable and a maleate organotin compound is used, more preferably, because of excellent hydrophilization of the coat surface in the initial stage of formation of the coat.

The amount of the component (H) is not specifically limited, but it is preferably from 0.1 to 20 parts by weight, and more preferably from 0.1 to 10 parts by weight, relative to 100 parts by weight of the resin solid content of the component (A). When the amount of the component (D) is less than 0.1 parts by weight, the curing property is lowered. On the other hand, when the amount exceeds 20 parts by weight, the appearance of the coat tends to be lowered.

(viii) Solvent

In the present invention, the solvent used in the field of the coating can be used without being specifically limited. Examples of the organic solvent include the following.

The solvent having activate hydrogen, which reacts with an isocyanate group, is not preferable in the coating using an isocyanate compound.

Aliphatic hydrocarbon: n-hexane, n-pentane, n-octane, nonane, decane, undecane, dodecane or the like.

Alicyclic hydrocarbon: cyclohexane, tetrarine, or the like.

Aromatic hydrocarbon: toluene, xylene, solvent naphtha or the like.

Ester compound: ethyl acetate, butyl acetate, isoamyl acetate or the like.

Ketone compound: methyl ethyl ketone, methyl isobutyl ketone, cyclohexanone or the like.

Others: terpin oil, mineral spirit, ethylcellosolve acetate or the like.

Among the above solvents, an aliphatic hydrocarbon and an alicyclic hydrocarbon correspond to a weak solvent, which is a solvent used in (PU-II) and does not have a strong dissolving capability.

(ix) Other Additives a. The anti-contamination coating composition of the present invention can be used as a clear coating composed of only essential components such as resin forming component, alkoxysilyl compound and the like, but a coloring pigment may be mixed to form a colored (enamel) coat. As the coloring pigment, there can be used an inorganic pigment such as titanium oxide, zinc oxide, carbon black, ferric oxide (red oxide), lead chromate (molybdate orange), chrome yellow, yellow iron oxide, ocher, ultramarine, cobalt green or the like; and an organic pigment such as azo pigment, naphthol pigment, pyrazolone pigment, anthraquinone pigment, perylene pigment, quinacridone pigment, disazo pigment, isoindolinone pigment, benzoimidazol pigment, phthalocyanine pigment, quinophthalone pigment or the like.

b. It is possible to add an extender filler such as ground limestone, clay, kaolin, talc, precipitated barium sulfate, barium carbonate, white carbon, diatomaceous earth or the like. Particularly, in case of forming a matte coat, it is optimum to use white carbon and diatomaceous earth hardly affecting the anti-contamination effect on the surface of the coat. On addition of these inorganic substances to the coating, it is preferred to treat with a coupling agent on the surface of the powder, and to add a coupling agent to the coating.

In the anti-contamination coating composition of the present invention, various additives, which can be mixed with the coating, can be mixed as far as the effect of the present invention is not adversely affected. Examples of the additives include plasticizers, preservatives, mildewproofing agents, anti-algae agents, anti-foaming agents, leveling agents, pigment dispersing agents, anti-settling agents, anti-sag agents, delusterants, diluents, ultraviolet absorbers, light stabilizers, antioxidants and the like.

c. It is possible to optionally use publicly known additives used in the field of the coating, for example, cellulose such as nitrocellulose, cellulose acetate butylate or the like; resin such as epoxy resin, melamine resin, vinyl chloride resin, polypropylene chloride, chloride rubber, polyvinyl butyral or the like without being specifically limited.

d. Further, the coating composition of the present invention can be diluted appropriately with a solvent. The solvents are not specifically limited as far as they do not react with the polyisocyanate compound (B1), and examples thereof include aromatic hydrocarbon, ester, ketone and aliphatic hydrocarbon solvent.

The storage stability can be improved by using ketones, such as acetone, methyl ethyl ketone, 2-pentanone, 2-hexanone, cyclohexane, alone or in combination as the solvent of the polyisocyanate compound (B1). Moreover, it is preferable to add a water-removing agent such as Additive TI (manufactured by Beyer Co.) to prevent an isocyanate group from reacting with water, which penetrates into a preserving vessel in order to inactivate it.

e. A dehydrating agent and/or an alkyl alcohol can be added to the alkoxysilyl group-containing acrylic copolymer resin-based anti-contamination coating composition, thereby making it possible to secure the long-term storage stability.

Specific examples of the dehydrating agent include hydrolytic ester compound such as methyl ortho-formate, ethyl ortho-formate, methyl ortho-acetate, ethyl ortho-acetate, methyltrimethoxysilane, γ-methacryloxypropyltrimethoxysilane, vinyltrimethoxysilane or the like.

The alkyl alcohol includes lower molecular weight alcohol such as methanol, ethanol or the like.

These dehydrating agents and/or alkyl alcohol are preferably added in an alkoxysilyl group-containing copolymer (AS).

The amount of the dehydrating agent and/or alkyl alcohol is not specifically limited, but is preferably from 0.5 to 20 parts by weight, and more preferably 2 to 10 parts by weight, relative to 100 parts by weight of the resin solid content of the component (AS). When the dehydrating agent and alkyl alcohol are used in combination, a significant effect is obtained in stability, favorably.

Use for Application of Coating, Coating Method

The anti-contamination coating composition of the present invention can be used in surface finishing of various materials such as metal, glass, ceramic tile, concrete, sizing board, extruded plate, plastics, and the like, which are used for protecting a substrate such as building structures and civil engineering structures. At this time, the anti-contamination coating composition of the present invention is applied on the final finishing surface, and it is possible to directly coat on a base material and to coat on the surface on which any surface finishing is applied (undercoating, etc.), but is not specifically limited.

It is suitable for finishing coating material defined in JIS A 6909 (1995), particularly multi-layer finishing coating material, facing material of heavy finishing coating material. Moreover, it can be efficiently used as a facing material of a design coating material such as facing material of various pattern coating materials, stone-like coating material, multi-design coating material and the like.

The anti-contamination coating composition of the present invention can be coated by various methods such as dipping, brushing, spray coating, roller coating, flow coater, roll coater and the like after adding various additives to prepare the coating.

EXAMPLES

The feature of the present invention will become more apparent from the following Examples and Comparative Examples.

In the following Examples and Comparative Examples, "parts" are by weight unless otherwise stated.

Synthesis Example (Synthesis Example I) Synthesis Examples of Alkoxysilane Condensate (Alkyl Silicate condensate)

To 100 parts by weight of an alkyl silicate raw material such as methyl silicate, etc., a predetermined amount of alcohols and 0.03 parts of dibutyltin dilaurate as a catalyst were added. After mixing, the mixture was subjected to the demethanolation reaction at 75° C. for 8 hours to synthesize alkoxysilane condensates 1 to 8, respectively.

With respect to the resulting alkoxysilane condensates, the kind and amount of used alcohols, ester interchange rate, and residual ratio of silica after calcination at 900° C. were shown in Table 1, Table 16 and Table 22, respectively.

(Synthesis Example II)

① Synthesis Example of Polyalkylene Oxide Chain-containing Alkoxysilane Compound 1

In a reaction vessel equipped with a heater, a stirrer, a reflux condenser, a dehydrator and a thermometer, 20 parts of Polyethylene Glycol 200 (average-molecular weight: 200, manufactured by Wako Junyaku Co., Ltd.), 54.3 parts of Y-9030 (manufactured by Nippon Unicar Co., Ltd.) as an isocyanate-containing silane and 0.05 parts of dibutyltin dilaurate were charged, and the mixture was reacted at 50° C. for 8 hours to obtain a pale yellow polyethylene oxide chain-containing alkoxysilane compound 1. The weight-average molecular weight of this polyethylene oxide chain-containing coupling agent was measured in terms of polystyrene by gel permeation chromatography (hereinafter referred to as "GPC"). As a result, it was 800 as converted to polystyrene (In Table 3, it was represented by "PEO-alkoxysilane compound 1").

② Synthesis Example of Polyalkylene Oxide Chain-containing Alkoxysilane Compound 2

In a reaction vessel equipped with a heater, a stirrer, a reflux condenser, a dehydrator and a thermometer, 100 parts of Epolite 40E (average-molecular weight: 170, manufactured by Kyoei-sha Kagaku Co., Ltd.) and 63.0 parts of A-1100 (manufactured by Nippon Unicar Co., Ltd.) as an amino group-containing silane were charged, and the mixture was reacted at 50° C. for 8 hours to obtain a pale yellow polyethylene oxide chain-containing coupling agent (2). The weight-average molecular weight of this polyethylene oxide chain-containing coupling agent was measured in terms of GPC. As a result, it was 980 as converted to polystyrene (In Table 3, it was represented by "PEO-alkoxysilane compound 2").

(Synthesis Example III) Synthesis Example of Alkyl Silicate Condensates 9 to 14

Synthesis Example of Alkyl Silicate Condensate 9

To 100 parts by weight of methyl silicate having a weight-average molecular weight of 1000, a condensation degree of about 8 and a nonvolatile content of 100% (hereinafter referred to as "methyl silicate A"), 71.4 parts by weight of n-hexyl alcohol and 0.03 parts by weight of dibutylthin dilaurate as a catalyst were added. After mixing, the mixture was subjected to the demethanolation reaction at 75° C. for 8 hours to synthesize an alkyl silicate condensate 1.

The ester interchange rate of this alkyl silicate condensate 1 was 39%, and the residual ratio of silica after calcining at 900° C. was 37.6%.

Synthesis Example of Alkyl Silicate Condensate 10

100 parts by weight of methyl silicate A, 17.6 parts by weight of n-amyl alcohol and 0.03 parts by weight of dibutyltin dilaurate were mixed in the same manner as that described in Synthesis Example 1 to synthesize an alkyl silicate condensate 2.

The ester interchange rate of this alkyl silicate condensate 2 was 11%, and the residual ratio of silica was 50.3%.

Synthesis Example of Alkyl Silicate Condensate 11

100 parts by weight of methyl silicate A, 38.4 parts by weight of n-hexyl alcohol and 0.03 parts by weight of dibutyltin dilaurate were mixed in the same manner as that described in Synthesis Example 1 to synthesize an alkyl silicate condensate 3.

The ester interchange rate of this alkyl silicate condensate 3 was 22%, and the residual ratio of silica was 43.7%.

Synthesis Example of Alkyl Silicate Condensate 12

100 parts by weight of methyl silicate A, 105.6 parts by weight of n-amyl alcohol and 0.03 parts by weight of dibutyltin dilaurate were mixed in the same manner as that described in Synthesis Example 1 to synthesize an alkyl silicate condensate 4.

The ester interchange rate of this alkyl silicate condensate 4 was 67%, and the residual ratio of silica was 33.4%.

Synthesis Example of Alkyl Silicate Condensate 13

100 parts by weight of methyl silicate A, 80.2 parts by weight of n-tridecyl alcohol and 0.03 parts by weight of dibutyltin dilaurate were mixed in the same manner as that described in Synthesis Example 1 to synthesize an alkyl silicate condensate 5.

The ester interchange rate of this alkyl silicate condensate 5 was 22%, and the residual ratio of silica was 33.5%.

Synthesis Example of Alkyl Silicate Condensate 14 (Polyalkylene Oxide Chain-containing Alkoxysilane Compound)

In a reaction vessel equipped with a heater, a stirrer, a reflux condenser, a dehydrator and a thermometer, 20 parts of Polyethylene Glycol 200 (average-molecular weight: 200, manufactured by Wako Junyaku Co., Ltd.), 54.3 parts of Y-9030 (manufactured by Nippon Unicar Co., Ltd.) as an isocyanate-containing silane and 0.05 parts of dibutyltin dilaurate were charged, and the mixture was reacted at 50° C. for 8 hours to obtain a pale yellow polyethylene oxide chain-containing alkoxysilane compound. The weight-average molecular weight of this polyethylene oxide chain-containing alkoxysilane compound was measured in terms of polystyrene by gel permeation chromatography (hereinafter referred to as "GPC"). As a result, it was 800 as converted to polystyrene.

Examples 1 to 9, Comparative Examples 1 to 7

Test Examples with respect to (PU-I) are as follows.

The formulations of test coatings of the Examples are shown in Table 3, whereas the formulations of test coatings of the Comparative Examples are shown in Table 4. Characteristics of polyols and fluorine-containing copolymers, which are used in these formulations, are summarized in Table 2. The isocyanate compound used in the Examples described in Tables 3 and 4 is a ketone solution of a trimer of hexamethylene diisocyanate and the NCO content of the liquid is 23.1% by weight.

Examples 10 to 21, Comparative Examples 8 to 16

The test results of a (PU-III)-based anti-contamination coating are described hereinafter.

Elastic coating compositions are prepared using raw materials shown in Table 8 according to the formulation shown in Tables 9 and 10. Namely, 80 parts by weight of rutile titanium oxide was mixed relative to 200 parts by weight of polyol (100 parts by weight in a solid content) and the mixture was stirred sufficiently. Subsequently, 3 parts by weight of caprolactonediol and 10.7 parts by weight of alkoxysilane compound 1 (5 parts by weight in terms of $SiO_2$) were added to the mixture and then 66.7 parts by weight (mixed in NCO/OH equivalent ratio of 1.0) of isocyanate 1 was added and the mixture was stirred to be an elastic coating composition. Weathering resistance test, heating/cooling repeating test, and rain-striped contamination resistance test were carried out.

Examples 22 to 30, Comparative Example 17 to 25

Using raw materials shown in Table 12, the evaluation was carried out with respect to the formulations of Tables 13 and 14. Regarding Example 28, a pigment was previously dispersed in a polyol 3, and then other components were added to prepare a coating composition, respectively.

Examples 31 to 38, Comparative Example 26 to 33

Among (PU-II)-based coatings, the testing results are shown in Examples 31 to 38 and Comparative Examples 26 to 33.

Using raw materials shown in Table 17, the evaluation was carried out with respect to the formulation of Table 18 in case of the Examples, and the formulation of Table 19 in case of the Comparative Examples. The evaluation results are shown in Tables 20 and 21. Good results were obtained in all Examples. Regarding Example 38, a pigment was previously dispersed in a polyol 1, and then other components were added to prepare a coating composition, respectively.

Examples 39 to 44, Comparative Examples 34 to 41

Examples of the (AC)-based coating are as follows.

Using raw materials shown in Table 23, enamel coatings of Examples 39 to 44 and Comparative Examples 34 to 41 were prepared according to the formulations in Table 24. The preparation method is as follows.

Method for Preparation of Coating 100 parts by weight of the solid content of various acrylic resins was uniformly kneaded with 80 parts by weight of a pigment and various silicates or alkoxysilane condensates were added in the proportion shown in Table 3. Furthermore, a polyalkylene oxide chain-containing alkoxysilane compound or polyethylene glycol was mixed (not mixed in case of Comparative Examples 34, 35, 38 and 39) to prepare white enamel coatings 1 to 14.

Coatings 1 and 2 are those obtained by using normal silicates, whereas coatings 3 to 6 are those obtained by using an alkoxysilane condensate including alkyl groups having a chain length of 3 to 10.

Examples 45 to 51. Comparative Examples 42 to 47

Using the Test Examples using the (AS) resin, formulations of test coatings of the Examples are shown in Table 26 and those of the Comparative Examples are shown in Table 27, respectively.

As the alkoxysilyl group-containing acrylic silicon resin, "Zemrac" (manufactured by Kanegafuchi Chemical Industries Co., Ltd.)(average molecular weight: 15000, glass transition temperature: 30° C., resin solid content: 50%) was used. The evaluation results are summarized in Table 28.

Evaluation

The coat was evaluated by the method described below.
(1) Measurement of Contact Angle The resulting coating composition was spray-coated on an aluminum plate of 150 mm×75 mm×0.8 mm in a dry film thickness of 40 $\mu$m to prepare a sample.

The resulting sample was dried and aged for 7 days at the standard condition, and then a contact angle was measured. Subsequently, the sample was dipped in deionized water for 3 hours and the sample was dried for 18 hours, and then the contact angle was measured. This operation of dipping in deionized water for 3 hours and drying for 18 hours was repeated twice, and then the contact angle was measured four times by using a CA-A type contact angle measuring device manufactured by Kyowa Kaimen Kagaku Co., Ltd. In this test, actual rainfall conditions are artificially made, and used rain is not acidic rain but rain of normal pH.
(2) Anti-contamination Test A SK#1000 primer (epoxy resin primer, product manufactured by SK Kaken Co., Ltd.) was spray-coated on an aluminum plate of 300 mm×150 mm×3.0 mm in dry film thickness of 30 $\mu$m, and the plate was dried for 8 hours at standard state.

Subsequently, the resulting coating composition was spray-coated on an aluminum plate, on which the above primer was coated, in a dry film thickness of 40 $\mu$m, and the plate was dried for 7 days at standard state to obtain a specimen for exposure test.

Outdoor exposure of the sample was carried out at an angle of 45 degrees facing in the southern direction at Ibaragi-city, Osaka-fu, and then a difference in brightness ($\Delta$L value) was measured at initial stage, after 1 month, after 3 months, after 6 months and after 1 year , respectively, and the anti-contamination test was evaluated. The $\Delta$L value was measured by using a TC-1800 type color-difference meter (manufactured by Tokyo Denshoku Co., Ltd.). The smaller the absolute value of $\Delta$L value, the smaller the change in brightness, resulting in coating having excellent anti-contamination property.
(3) Rain-striped Contamination Resistance Test An aluminum plate of 300 mm×150 mm×3.0 mm was bent at one third of the long side to give a plate for exposure. On an obtuse-angle surface of this plate for exposure (convex face), the same primer coating as that applied on the anti-contamination test sample of (3) and coating of a test coating composition were carried out, and the plate was dried under the same condition to obtain a sample for exposure.

Outdoor exposure was carried out by placing the resulting sample for outdoor exposure, a long side formed after bending of said sample being in a vertical state, facing in the southern direction at Ibaragi-city, Osaka-fu. Evaluations were carried out by visually observing the presence or absence of rain-striped contamination. The evaluation was performed at initial stage, after 1 month, after 3 months, after 6 months and after 1 year. The results are evaluated by the following.

⊚: No rain-striped contamination is observed.

○: Trace of rain-striped contamination is observed slightly.

Δ: Trace of rain-striped contamination is observed.

X: Severe trace of rain-striped contamination is observed.
(4) Stain Resistance Test A coat composed of a primer (30 $\mu$m) and a coating (40 $\mu$m) was formed on an aluminum plate of 150×70×0.8 mm in the same manner as evaluation (3) and (4) to obtain a sample.

The resulting sample was aged for 7 days at the standard condition and 15% by weight of a carbon black water-dispersed paste liquid was dropped on the coat surface so that a drop of a diameter of 20 mm and height of 5 mm was formed anti-contamination test according to a stain resistance test (JIS K-5400 (1990) 8.10). Then, the sample was allowed to stand in a temperature-constant room at 50° C. for 2 hours. Then, the samples were washed with flowing water and the degree of contamination of the coat surface was visually observed. The results are determined according to the following criteria.

⊚: No contamination is observed.

○: Trace of contamination is observed slightly.

Δ: Trace of contamination is observed.

X: Severe trace of contamination is observed.
(5) Recoating Test

The above SK#1000 primer was spray-coated on an aluminum plate of 150 mm×70 mm×0.8 mm in dry film thickness of 30 sum and the plate was dried for 8 hours at standard state.

The test coating was spray-coated on four aluminum plates in dry film thickness of 25 $\mu$m, aged and then dried for 16 hours, 1 day, 3 days and 7 days, respectively. Subsequently, the same test coating was spray-coated thereon in a dry film thickness of 25 μm, e.g. total film thickness of 50 μm to obtain a sample.

The resulting sample was aged for 7 days at the standard state and the adhesion was evaluated according to a cross cut test of the adhesion (JIS K-5400 (1990) 8.8.1). The evaluation results are represented by the score shown in Table 5.

(6) Lifting Test

Test coatings 1 and 3

A white coating composition of formulation of Example 23 was diluted (outer percentage, diluted by 30% by weight) by adding 100 parts by weight of xylene, and the diluted solution was mixed and stirred to obtain a white test coating 1 for spray coating.

At that time, the content of the aliphatic hydrocarbon solvent in all solvents was 37% by weight.

In the same manner, a test coating 3 for coating of Example 31 was prepared.

Test Coatings 2 and 4

A white coating composition of formulation of Example 23 was further diluted (outer percentage, diluted by 30% by weight) by adding 100 parts by weight of LAWS (Mineral spirit manufactured by Shell Petroleum Oil Co., Ltd.), and the diluted solution was mixed and stirred to obtain a white test coating 2 for spray coating.

At the time, content ratio of aliphatic hydrocarbon solvent in all solvents was 68% by weight.

Similarly, a test coating 4 for coating of Example 31 was prepared.

Test Method

On two slate plates of 200 mm×300mm×4 mm, a Milac sealer ES (manufactured by SK Kaken Co., Ltd.; one liquid epoxy resin sealer) was spray-coated in a desired amount of 0.2 Kg/M$^2$, and the plates were dried for 1 hour at standard state. Then, a SK acrylic color (manufactured by SK Kaken Co., Ltd.; one liquid solvent type acrylic resin topcoat) was spray-coated in a desired amount of 0.3 Kg/m$^2$, and the plates were aged for 7 days at standard state. Using this coat as an old coat, the above test coatings 1, 2, 3 and 4 were spray-coated in a desired amount of 0.15 Kg/m$^2$, respectively, and the plates were dried for 24 hours at standard state. Subsequently, each coating was further spray-coated in a desired amount of 0.15 Kg/m.

Results

The state of the coat surface was observed. As a result, the slate plates on which the coatings 1 and 3 were sprayed caused shrink on the surface and a lifting phenomenon was observed.

The slate plates on which the coatings 2 and 4 were sprayed, have good surface condition, and a lifting phenomenon was not observed.

(7) Evaluation of Compatibility

Regarding the PU-II base having specific SP value, a compatibility test was carried out.

Using raw materials as shown in Tables 12 and 17, each component except for pigments in the formulation shown in Tables 13, 14, 18 and 19 were mixed and the evaluation was performed. That is, 200 parts by weight of a polyol 3 (solution type acrylic polyol) and 47.0 parts by weight of isocyanate were mixed (isocyanate was mixed in a NCO/OH ratio of 1.0 relative to a hydroxyl group of acrylic polyol), and 10.5 parts by weight of an alkoxysilane condensate was added to the mixture (mixed in the amount of 5.0 parts by weight in term of $SiO_2$), and then the mixture was sufficiently stirred. The resulting mixture was spray-coated on a transparent glass plate of 150 mm×50 mm×3 mm in a dry film thickness of 40 μm, and then aged and dried at the temperature of 20° C. and a humidity of 65% (hereinafter referred to as a "standard state") for 24 hours. Thereafter, the transparency of the film was visually evaluated.

The evaluation was performed according to the following criteria. The results are shown in Tables 15 and 20.

○: Completely transparent state

Δ: The state where slight turbidity is observed

X: Opaque state with white turbidity (8) Evaluation of Appearance after Curing of Coat Regarding the acrylic resin (AC)-based coating, the appearance after curing of the coat was evaluated.

On seven aluminum plates of 150 mm×75 mm×0.8 mm, a SK#1000 primer (epoxy resin primer, product manufactured by SK Kaken Co., Ltd.) was spray-coated in a dry film thickness of about 30 μm, and the plates were dried at the temperature of 20° C. and humidity of 65% for 8 hours.

Subsequently, the enamel coating was spray-coated on the surface of the SK#1000 primer of the above aluminum plate in a dry coat thickness of 25 μm to obtain a sample.

The sample was aged at the temperature of 20° C. and humidity of 65% for 7 days, and the appearance of the coat was evaluated by an appearance test of the coat according to JIS K5400 7.1. The evaluation was performed by the following criteria.

○: No abnormality is observed. Regarding those wherein abnormality is observed, the abnormality is concretely described. The results are shown in Table 25.

(9) Weathering Resistance Test

Regarding the coating (PU-III) forming a coat having elasticity, the weathering resistance test was also carried out.

The resulting elastic coating composition was coated on an aluminum plate of 75 mm×75 mm×0.8 mm in a wet thickness of 125 μm by using an applicator to obtain a test plate. The test plate was aged at the temperature of 20° C. and a humidity of 65% (hereinafter referred to as "standard state") for 7 days, and then the weathering resistance test was carried out using a "Super UV Tester (SUV-W13)" manufactured by Iwasaki Denki Co., Ltd.

In the test, a cycle of ultraviolet radiation in an atmosphere of a temperature of 60° C. and a humidity of 65% for 6 hours and standing in an atmosphere of a temperature of 30° C. and a humidity of 90% or more for 2 hours was repeated 30 times and gloss retention was measured. The gloss retention (GR) was determined by measuring 60° specular gloss(G0) before testing and 60° specular glossiness(G1) after testing according to JIS K 5400 7.6, "specular gloss", and calculating according to the following equation:

$$GR(\%)=100\times G1/G0.$$

The results are shown in Table 9.

(10) Heating/cooling Repeating Test

Regarding the coating (PU-III) forming a coat having elasticity, the weathering resistance test was also carried out.

Using a slate plate of 150 mm×75 mm×6 mm as a substrate for sample (back and side surfaces (total five surfaces) of each substrate were sealed with a solvent-free epoxy resin), an EX sealer (manufactured by SK Kaken Co., Ltd.: chlorinated rubber type solvent undercoat) was spray-coated on the substrate to adjust the surface condition in a desired amount of 0.2 Kg/m², and the plate was dried for 4 hours at standard state. Then, Lenaexcellent (acrylic rubber waterproofing multi-layer coating material E manufactured by SK Kaken Co., Ltd.) was spray-coated on the substrate by two portions to adjust the surface condition in a desired amount of 0.2 Kg/m². The plates were dried for 24 hours at the standard state. Subsequently, the elastic coating composition was coated by two portions in a dry film thickness of 50 µm to obtain a sample.

The resulting sample was aged for 7 days at the standard state, and then tested according to JIS A6909 (1995) 6.11, "Heating/cooling repeating test".

After one cycle of 24 hours was carried out ten times, the appearance of the coat was evaluated, and then it was evaluated every 10 cycles up to 30 cycles (total 3 times of evaluation). The results are shown in Table 9.

Evaluation Results

Examples 1 to 9, Comparative Examples 1 to 7

The evaluation results are summarized in Table 6. As is apparent from these results, the following points can be pointed out.

a) In the anti-contamination coating of the present invention (Examples 1 to 9), a decrease in contact angle was observed even in the water dipping test in which actual rainfall was assumed, and excellent anti-contamination property and rain-striped contamination resistance could be obtained.

b) In case of the coatings of Examples 1 and 3, good coat can be obtained when topcoating was carried out within 16 hours. In the other Examples, excellent recoating property was obtained even after a lapse of long time.

c) In case of the conventional polyurethane resin coating (Comparative Example 1) and fluorine resin coating (Comparative Example 2), which do not contain alkoxysilane or silicates, the contact angle was large and the contamination resistance and rain-striped contamination resistance were insufficient.

d) In the coating obtained by adding a normal alkyl silicate (Comparative Example 3), the rain-striped contamination resistance tends to be improved after a lapse of 6 months or more, but it is insufficient in the initial stage. The recoating property was deteriorated with a lapse of time.

e) In case of using an alkoxysilane condensate containing alkyl groups having 1 and 12 carbon atoms (Comparative Example 6) or using an alkoxysilane condensate containing alkyl groups having 1 and 3 carbon atoms and alkyl groups having 1 and 5 carbon atoms and having an exchange rate of more than 50% (Comparative Examples 4 and 5), the contamination resistance and rain-striped contamination resistance were insufficient.

f) It has been found that coating obtained by adding excess alkoxysilane condensate (Comparative Example 7) is superior in contamination resistance and rain-striped contamination resistance in the initial stage, but crack occurs on the whole surface of the coat after three months and the durability is insufficient.

Examples 10 to 21, Comparative Examples 8 to 16

It is apparent that the (PU-III)-based coatings of Examples 10 to 21 show good weathering resistance, heating/cooling repeating resistance and high durability. Particularly, Examples 12 and 13 containing a polyalkylene oxide chain-containing alkoxysilane compound show good results in the rain-striped contamination test from the initial stage.

On the other hand, Comparative Example 8 using a resin having low Tg shows poor weathering resistance. As a matter of course, the contamination resistance was also poor. Comparative Example 9 having the same formulation as that of a normal elastic urethane resin coating shows sufficient durability, but the contamination resistance was poor. It has been found that the weathering resistance of Comparative Example 10 obtained by adding caprolactonediol to a normal elastic urethane resin coating tends to be deteriorated in comparison with Comparative Example 9 and, furthermore, blister occurred in the heating/cooling repeating test and the durability is poor.

It has been found that Comparative Example 11 obtained by mixing methyl silicate with a normal elastic urethane resin coating showed comparatively good anti-contamination property, but crack occurred in the heating/cooling repeating test and crack also occurred with a lapse of time in the exposure test of the rain-striped contamination resistance so that the durability is insufficient. It has been found that Comparative Example 12 obtained by adding only the component (C1) of the present invention to a normal elastic urethane resin coating is inferior in durability like Comparative Example 11.

The Example obtained by adding a large amount of the component (G) are inferior in weathering resistance and contamination resistance. It has been found that Comparative Example 14 obtained by mixing a large amount of the component (C1) shows good weathering resistance and contamination resistance, but crack occurred in the heating/cooling repeating test and crack also occurred with a lapse of time in the exposure test of the rain-striped contamination resistance so that the durability is poor.

Comparative Example 15 obtained by adding an alkoxysilane compound 3 containing alkyl groups having 12 carbon atoms shows poor contamination resistance. Comparative Example 16 obtained by mixing the poylol having low Tg and the components (G) and (C1) of the present invention shows poor weathering resistance like Comparative Example 8.

Accordingly, it has been found that there can be obtained a coating composition capable of forming an elastic anti-contamination coat having good durability and contamination resistance by mixing the components (A3), (B2), (G), and (C1) of the present invention with good balance.

Examples 22 to 30, Comparative Examples 17 to 25

The results shown in Table 15 were obtained and all Examples showed good results. It is apparent that the compatibility between the alkoxysilane condensate and resin is good and the measured contact angle shows excellent hydrophilicity. It has also been found that the rain-striped contamination was not observed and the contamination resistance is excellent. In particular, the water dipping test is that which reproduces actual rainfall several times. It has been found that good hydrophilicity was shown after rainfall. In particular, Examples 29 and 30 obtained by adding the component (D) show good contamination resistance from the initial stage, and excellent results were obtained in initial contamination resistance and stain resistance.

Comparative Examples 17 to 19 using a commercially available alkyl silicate had poor compatibility and surface orientation property and, therefore, the surface of the coat is not hydrophilized and rain-striped contamination occurred and the contamination resistance is poor. In the coating of Comparative Example 20, wherein ester interchange rate of an alkyl group is high, it is found that rain-striped contamination occurred and contamination resistance is bad because surface hardly become hydrophilicity. When chain length of alkyl group is too long, rain-striped contamination occurred and contamination resistance becomes worse same as Comparative Example 21 because it does not become hydrophilicity.

When Comparative Example 22 has normal formulation of weak solvent type coating, it is found that rain-striped contamination occurred and contamination resistance is bad because the surface has no hydrophilicity. When the amount of the component (C2) is small, the same results were obtained. When the amount of the component (C2) is much, because the component (C2) was oriented to the surface so that it becomes hydrophilicity, but cure of coat tends to be slower. On the other hand, with time, crack occurred because the surface becomes rigid, thereby bringing results that have problems in durability of a coat.

Examples 31 to 38, Comparative Examples 26 to 33

In the coating of Examples 4 to 7, wherein a polyalkylene oxide chain-containing alkoxysilane compound (D) is contained, lowered of contact angle is large owing to repeat of water dipping, surface of coat has hydrophilicity, so that it was found that contamination resistance at early stage is good. Similarly, the result that stain resistance is excellent was obtained.

In the coating of Comparative Examples 26 to 28, using commercially available alkyl silicate, compatibility and surface orientation were bad, so that the surface had no hydrophilicity, rain-striped contamination occurred, so that it is found that contamination resistance was poor. In addition, stain resistance showed bad results.

In the coating of Comparative Example 29, wherein the ester interchange rate of alkyl group of alkoxysilane compound is high, the surface hardly becomes hydrophilicity, rain-striped contamination occurred, so that contamination resistance is bad.

When the chain length of alkyl group is too long, the same as Comparative Example 30, it does not become hydrophilicity, so that it is found that contamination resistance is bad. Comparative Example 31 has normal formulation of weak solvent type coating, but it is found that rain-striped contamination occurred and contamination resistance is bad. In the coating of Comparative Example 32, wherein the amount of alkoxysilane compound is little and amine compounds are not contained, contamination resistance is bad, the same as Comparative Example 31. In the coating of Comparative Example 33, wherein the amount of alkoxysilane compound is large and no amine compound is contained, coat surface has hydrophilicity, but there is a problem in interlaminar adhesion and crack occurred because the surface becomes rigid with time, thereby resulting in a problem in durability of a coat. On the other hand, all Comparative Examples having bad contamination resistance, also have bad results in stain resistance.

Example 39 to 44, Comparative Examples 34 to 41

From the results of Table 24, the following evaluation can be obtained.

In particular, it is found that the results of an evaluation for rain-striped contamination in Examples 41 to 44 are excellent. On the other hand, comparing Example 40 with Example 43, in the alkoxysilane condensate of Example 43, in a small addition amount lowered contact angle can be observed, and excellent results are obtained in rain-striped contamination resistance. Therefore, it was found that in the case of using the alkoxysilane condensate wherein those having the 3 to 10 chains of alkyl group are combined with each other, excellent contamination resistance can be obtained in a small addition amount. The coating of Comparative Example 34 is that same formulation with normal acrylic resin coating, but lowered contact angle was not observed, and bad results were obtained in rain-striped contamination resistance and stain resistance.

On the other hand, the coating of Comparative Example 35, wherein polyalkylene oxide chain-containing alkoxysilane compound as one of essential structural element of the present invention is not contained, effect can be observed but, in particular, an inferior result in contamination resistance in the initial stage was obtained.

In addition, in Examples 36 and 37 wherein polyethylene glycol is added in spite of polyalkylene oxide chain-containing alkoxysilane compound, gloss is lowered, and tack also occurred in the surface of the coat. Therefore, it was found that there are problems in the physical properties of the coat and in practical use.

In Comparative Example 38 wherein the alkoxysilane condensate having the chain length of 3 to 10 of alkyl group and high ester interexchange rate, certain effects were observed but they are inefficient results.

In Comparative Example 39 wherein the alkoxysilane condensate having the chain length for alkyl group of 12 is used, the same tendency as coating 11 can be observed.

In Comparative Example 40 wherein the addition amount of an alkoxysilane condensate is little, the same tendency as that in Comparative Example 34 was observed, in that it was found that there was little stain resistance.

In contrast, in Comparative Example 41 wherein addition amount of alkoxylsilane condensate is much, lowered contact angle is observed, but according to field exposure crazing called crack occurred in its surface, so that it was found that there were practical problems.

Examples 45 to 51, Comparative Examples 42 to 47

The evaluation results are collectively shown in Table 28. From this result, the following points can be indicated.

1) In the anti-contamination coating composition (Examples 45 to 51), lowered contact angle also can be observed in the water dipping test assuming real rainfall, and excellent contamination resistance and rain-striped contamination resistance are obtained.

2) In particular, according to anti-contamination coating composition containing the component (D) (Examples 48 to 50), the result that from 1 month later, namely from such early state rain-strip is not observed at the vertical surface.

3) In the anti-contamination coating composition containing no component (C1) of the present invention, result of contamination resistance was not observed. On the other hand, at relatively initial stage, the coating had excellent rain-striped contamination resistance, but with time rain-strip became obvious.

4) In the anti-contamination coating composition containing the alkoxysilane condensate that is against the specified value according to the denaturation of the component (C1) (Comparative Examples 42, 45 and 46), effect of contamination resistance is not observed, and rain-strip is also obvious.

5) In the anti-contamination coating composition containing the alkoxysilane condensate that is against containing amount of the component (C1) (Comparative Examples 44), coat became brittle, and crack occurred in all surfaces.

6) In the anti-contamination coating composition containing normal methyl silicate in spite of denatured silicate of the component (C1) (Comparative Examples 47), appearance of effect in rain-striped contamination resistance was not obtained even in the early stage.

TABLE 1

| Synthetic Example | Alcohol used for modification | | | Ester exchange rate | | Residual ratio of $SiO_2$ |
|---|---|---|---|---|---|---|
| | Kind | Number of carbon atoms | Addition amount (parts by weight) | Number of equivalents | (%) | |
| Alkoxysilane condensate 1 | n-propanol | 3 | 12.0 | 2 | 11 | 53.0 |
| Alkoxysilane condensate 2 | n-butanol | 4 | 22.2 | 3 | 17 | 49.7 |
| Alkoxysilane condensate 3 | n-octyl alcohol | 8 | 26.0 | 2 | 11 | 46.8 |
| Alkoxysilane condensate 4 | n-decyl alcohol | 10 | 31.7 | 2 | 11 | 44.7 |
| Alkoxysilane condensate 5 | n-octyl alcohol | 8 | 91.1 | 7 | 39 | 33.2 |
| Alkoxysilane condensate 6 | n-propanol | 3 | 60.1 | 10 | 56 | 43.7 |
| Alkoxysilane condensate 7 | n-amil alcohol | 5 | 141.1 | 16 | 89 | 29.5 |
| Alkoxysilane condensate 8 | n-dodecyl alcohol | 12 | 37.3 | 2 | 11 | 42.8 |
| Methyl silicate A | — | — | — | — | — | 56.0 |

Note) Methyl silicate A: weight-average molecular weight: 1000, condensation degree: about 8, nonvolatile content: 100%, The addition amount of alcohol for modification is an addition amount relative to 100 parts by weight of methyl silicate A.

TABLE 2

| | Weight-average molecular weight | Hydroxyl group value (KOH mg/g) | Tg (°C.) | Resin solid content (% by weight) | Monomer composition |
|---|---|---|---|---|---|
| Polyol 1 | 60,000 | 50 | 40 | 50 | Methyl methacrylate, n-Butyl acrylate, Styrene, 2-Hydroxyethyl methacrylate |
| Polyol 2 | 60,000 | 50 | 40 | 50 | Methyl methacrylate n-Butyl acrylate, Styrene, N-dimethyl-aminoethyl acrylate 2-Hydroxyethyl methacrylate |
| Fluorine-containing copolymer 1 (content of fluorine) | 8,000 (19 wt %) | 100 | 20 | 50 | Monochlorotri-fluoroethylene, Ethyl vinyl ether, Beova 9, Hydroxybutyl vinyl ether |
| Fluorine-containing copolymer 2 (content of fluroine) | 8,000 (19 wt %) | 100 | 20 | 50 | Monochlorotri-fluoroethylene, Ethyl vinyl ether, Beova 9, N-dimethyl-aminoethyl acrylate Hydroxybutyl vinyl ether |

TABLE 3

<Composition of coating composition of Examples>

| | Examples | | | | | | | | |
|---|---|---|---|---|---|---|---|---|---|
| | 1 | 2 | 3 | 4 | 5 | 6 | 7 | 8 | 9 |
| Polyol 1 | 100 (200) | | | | 100 (200) | 100 (200) | | | |
| Polyol 2 | | 100 (200) | | | | | 100 (200) | | |
| Fluorine-containing copolymer 1 | | | 100 (200) | | | | | 100 (200) | |
| Fluorine-containing copolymer 2 | | | | 100 (200) | | | | | 100 (200) |
| Isocyanate [NCO/OH ratio] | (13.0) [0.8] | (9.8) [0.6] | (45.5) [1.4] | (26.0) [0.8] | (16.2) [1.0] | (19.0) [1.2] | (16.2) [1.0] | (39.0) [1.2] | (32.5) [1.0] |
| Alkoxysilane condensate 1 | 5.0 (9.4) | | | | | | 10.0 (18.8) | | |
| Alkoxysilane condensate 2 | | 8.0 (16.1) | | | | | | 8.0 (16.1) | |
| Alkoxysilane condensate 3 | | | 10.0 (21.4) | | | | | | 10.0 (21.4) |

TABLE 3-continued

<Composition of coating composition of Examples>

| | Examples | | | | | | | | |
|---|---|---|---|---|---|---|---|---|---|
| | 1 | 2 | 3 | 4 | 5 | 6 | 7 | 8 | 9 |
| Alkoxysilane condensate 4 | | | | 20.0 (44.7) | | | | | 20.2 (44.7) |
| Alkoxysilane condensate 5 | | | | | 35.0 (106) | | | | |
| PEO-alkoxysilane compound 1 | | | | | | 3.0 | 5.0 | | |
| PEO-alkoxysilane compound 2 | | | | | | | | 10.0 | 15.0 |
| Triethylamine | | | | | 1.0 | 0.3 | | 0.5 | |
| Rutile titanium oxide | 80.0 | 80.0 | 80.0 | 80.0 | 80.0 | 80.0 | 80.0 | 80.0 | 80.0 |

Note)
① The numerical value represents a solid content. The actual addition amount is given in parentheses.
② With respect to the alkoxysilane condensate and silicate, the amount in term of $SiO_2$ is described. The actual addition amount is given in parentheses.

TABLE 4

<Composition of coating composition of Comparative Examples>

| | Comparative Examples | | | | | | |
|---|---|---|---|---|---|---|---|
| | 1 | 2 | 3 | 4 | 5 | 6 | 7 |
| Polyol 1 | 100 (200) | | 100 (200) | 100 (200) | | | |
| Polyol 2 | | | | | | 100 (200) | 100 (200) |
| Fluorine-containing copolymer 3 | | 100 (200) | | | 100 (200) | | |
| Isocyanate | 16.2 [1.0] | 32.5 [1.0] | 16.2 [1.0] | 19.4 [1.0] | 32.5 [1.0] | 16.2 [1.0] | 16.2 [1.0] |
| Alkoxysilane condensate 1 | | | | | | | 45.0 (84.9) |
| Alkoxysilane condensate 6 | | | | 10.0 (22.9) | | | |
| Alkoxysilane condensate 7 | | | | | 20.0 (67.8) | | |
| Alkoxysilane condensate 8 | | | | | | 15.0 (35.1) | |
| Methyl silicate A | | | 10.0 (17.9) | | | | |
| Rutile titanium oxide | 80.0 | 80.0 | 80.0 | 80.0 | 80.0 | 80.0 | 80.0 |

Note)
① The numerical value represents a solid content. The numerical value in parentheses is an addition amount of the solution.
② With respect to the alkoxysilane condensate and silicate, the amount in term of $SiO_2$ is described and the actual addition amount is given in parentheses.

TABLE 5

<Evaluation criteria of recoating properties>

| Rating point | Condition |
|---|---|
| 10 | Each one line of a cut is thin and smooth, and there is no peeling at the cross point of cut and the cross of square. |
| 8 | A slight peeling can be observed at the cross point of cut, but not at the cross square. The area of the fracture portion is within 5% of the whole area of square. |
| 6 | Peeling can be observed at both sides of cut and at cross. The area of the fracture portion is within the range from 5 to 15% of the whole area of square. |
| 4 | The width of peeling based on a cut is wide, and the area of the fracture portion is within the range from 15 to 30% of the whole area of square. |
| 2 | The width of peeling based on a cut is wide, and the area of the fracture portion is within the range from 30 to 65% of the whole area of square. |
| 0 | The area of the fracture portion reaches not less than 65% of the whole area of square. |

TABLE 6

<Evaluation results>

|  |  | Examples | | | | | | | | | Comparative Examples | | | | | | |
| --- | --- | --- | --- | --- | --- | --- | --- | --- | --- | --- | --- | --- | --- | --- | --- | --- | --- |
|  |  | 1 | 2 | 3 | 4 | 5 | 6 | 7 | 8 | 9 | 1 | 2 | 3 | 4 | 5 | 6 | 7 |
| Contact angle (degree) | Before dipping in water | 70 | 72 | 69 | 70 | 68 | 58 | 58 | 56 | 54 | 78 | 90 | 72 | 76 | 92 | 92 | 66 |
|  | First dipping in water | 50 | 52 | 48 | 54 | 45 | 42 | 40 | 39 | 38 | 78 | 90 | 67 | 72 | 90 | 90 | 42 |
|  | Second dipping in water | 44 | 46 | 43 | 45 | 40 | 39 | 39 | 37 | 36 | 78 | 90 | 65 | 70 | 90 | 90 | 34 |
|  | Third dipping in water | 40 | 41 | 39 | 38 | 36 | 31 | 30 | 32 | 30 | 78 | 90 | 63 | 68 | 88 | 90 | 29 |
| Anti-staining properties (ΔL) | After 1 month | −2.4 | −2.2 | −2.0 | −2.0 | −1.8 | −1.0 | −0.9 | −1.0 | −0.8 | −6.8 | −8.8 | −5.6 | −6.2 | −9.4 | −7.0 | −1.2 |
|  | After 3 months | −2.0 | −1.8 | −1.7 | −1.6 | −1.5 | −1.0 | −0.9 | −0.9 | −0.8 | −7.8 | −9.4 | −5.0 | −6.0 | −10 | −7.1 | Whole area crack occurs |
|  | After 6 months | −1.2 | −1.0 | −1.1 | −1.0 | −0.9 | −0.9 | −0.8 | −0.7 | −0.7 | −8.2 | −12 | −4.2 | −5.9 | −11 | −5.3 |  |
|  | After 1 year | −0.8 | −0.6 | −0.7 | −0.9 | −0.6 | −0.6 | −0.7 | −0.7 | −0.6 | −9.4 | −14 | −3.4 | −5.2 | −13 | −4.5 |  |
| Rain-striped contamination resistance | After 1 month | ○ | ○ | ○ | ○ | ○ | ◎ | ◎ | ◎ | ◎ | × | × | × | × | × | × | ◎ |
|  | After 3 months | ◎ | ◎ | ◎ | ◎ | ◎ | ◎ | ◎ | ◎ | ◎ | × | × | × | × | × | × | Whole area crack occurs |
|  | After 6 months | ◎ | ◎ | ◎ | ◎ | ◎ | ◎ | ◎ | ◎ | ◎ | × | × | Δ | × | × | × |  |
|  | After 1 year | ◎ | ◎ | ◎ | ◎ | ◎ | ◎ | ◎ | ◎ | ◎ | × | × | ○ | × | × | × |  |
| Stain resistance |  | ◎ | ◎ | ◎ | ◎ | ◎ | ◎ | ◎ | ◎ | ◎ | × | × | Δ | × | × | × | ◎ |
| Recoating properties | After 16 hours | 10 | 10 | 10 | 10 | 10 | 10 | 10 | 10 | 10 | 10 | 10 | 10 | 10 | 10 | 10 | 8 |
|  | After 1 day | 8 | 10 | 8 | 10 | 10 | 10 | 10 | 10 | 10 | 10 | 10 | 6 | 8 | 8 | 10 | 4 |
|  | After 3 day | 0 | 10 | 0 | 10 | 10 | 10 | 10 | 10 | 10 | 10 | 10 | 0 | 0 | 0 | 10 | 0 |
|  | After 7 day | 0 | 10 | 0 | 10 | 10 | 10 | 10 | 10 | 10 | 10 | 10 | 0 | 0 | 0 | 10 | 0 |

TABLE 7

|  | Composition/properties | Solid content (%) | Weight-average molecular weight | Hydroxyl group value (KOH mg/g) | Tg (° C.) | Residual ratio of SiO₂ (% by weight) |
| --- | --- | --- | --- | --- | --- | --- |
| Polyol 3 | Monomer composition: methyl methacrylate, n-butyl acrylate, styrene, 2-hydroxyethyl methacrylate | 50 | 40,000 | 40 | 50 | — |
| Polyol 4 | Monomer composition: methyl methacrylate, n-butyl acrylate, 2-hydroxyethyl methacrylate | 50 | 40,000 | 40 | 10 | — |
| Isocyanate 2 | NCO content when the solid content is 100% 9%, hexamethylene diisocyanate solution | 50 | — | — | — | — |
| Isocyanate 3 | NCO content when the solid content is 100% 20%, hexamethylene diisocyanate solution | 50 | — | — | — | — |
| Caprolactondiol | Liquid | 100 | 2,000 | 60 | — | — |
| Caprolactoetriol | Liquid | 100 | 600 | 200 | — | — |
| Silicate | Methyl silicate A, Condensation degree: about 8 | — | 1,000 | — | — | 56.0 |
| Alkoxysilane condensate 3 | Described in Synthesis Example I | — | 1,200 | — | — | 46.8 |
| Alkoxysilane condensate 2 | Described in Synthesis Example I | — | 1,100 | — | — | 49.7 |
| Alkoxysilane condensate 8 | Described in Synthesis Example I | — | 1,300 | — | — | 42.8 |
| PEO-alkoxysilane compound 1 | Described in Synthesis Example II | — | 800 | — | — | — |

TABLE 8

|  | Example 10 | Example 11 | Example 12 | Example 13 | Example 14 | Example 15 | Example 16 | Example 17 | Example 18 | Example 19 | Example 20 | Example 21 |
| --- | --- | --- | --- | --- | --- | --- | --- | --- | --- | --- | --- | --- |
| Polyol 3 | 200 (100) | 200 (100) | 200 (100) | 200 (100) | 200 (100) | 200 (100) | 200 (100) | 200 (100) | 200 (100) | 200 (100) | 200 (100) | 200 (100) |
| Polyol 4 |  |  |  |  |  |  |  |  |  |  |  |  |
| Isocyanate 2 [NCO/OH ratio] | 66.7 (1.0) | 66.7 (1.0) | 66.7 (1.0) | 53.3 (0.8) | 66.7 (1.0) | 80.0 (1.2) | 66.7 (1.0) | 66.7 (1.0) | 66.7 (1.0) | 66.7 (1.0) | 66.7 (1.0) | 66.7 (1.0) |
| Isocyanate 3 [NCO/OH ratio] |  |  |  |  |  |  |  |  |  |  |  |  |
| Caprolactondiol |  | 3 |  | 10 | 10 |  | 10 | 10 | 15 | 10 | 10 | 15 |

TABLE 8-continued

|  | Example 10 | Example 11 | Example 12 | Example 13 | Example 14 | Example 15 | Example 16 | Example 17 | Example 18 | Example 19 | Example 20 | Example 21 |
|---|---|---|---|---|---|---|---|---|---|---|---|---|
| Caprolactontriol |  | 5 | 5 |  |  | 15 |  |  |  |  |  |  |
| Silicate |  |  |  |  |  |  |  |  |  |  |  |  |
| Alkoxysilane condensate 1 | 10.7 (5) |  | 10.7 (5) |  |  |  | 10.7 (5) | 21.4 (10) | 32.1 (15) |  |  |  |
| Alkoxysilane condensate 2 |  | 10.1 (5) |  | 20.1 (10) | 20.1 (10) | 20.1 (10) |  |  |  | 10.1 (5) | 20.1 (10) | 40.2 (20) |
| Alkoxysilane condensate 3 |  |  |  |  |  |  |  |  |  |  |  |  |
| Polyalkylene oxide chain-containing alkoxysilane compound |  |  | 10 | 5 |  |  |  |  |  |  |  |  |
| Rutile titanium oxide | 80 | 80 | 80 | 80 | 80 | 80 | 80 | 80 | 80 | 80 | 80 | 80 |

Regarding the numerical value: the solid content or the value in term of $SiO_2$ was described in parentheses.

TABLE 9

|  | Comparative Example 8 | Comparative Example 9 | Comparative Example 10 | Comparative Example 11 | Comparative Example 12 | Comparative Example 13 | Comparative Example 14 | Comparative Example 15 | Comparative Example 16 |
|---|---|---|---|---|---|---|---|---|---|
| Polyol 3 |  | 200 (100) | 200 (100) | 200 (100) | 200 (100) | 200 (100) | 200 (100) | 200 (100) |  |
| Polyol 4 | 200 (100) |  |  |  |  |  |  |  | 200 (100) |
| Isocyanate 2 [NCO/OH ratio] |  | 66.7 (1.0) | 66.7 (1.0) | 53.3 (0.8) | 66.7 (1.0) | 66.7 (1.0) | 80.0 (1.2) | 66.7 (1.0) |  |
| Isocyanate 3 [NCO/OH ratio] | 30.0 (1.0) |  |  |  |  |  |  |  | 30.0 (1.0) |
| Caprolactondiol |  |  |  | 15 |  |  | 10 | 10 | 15 |
| Caprolactontriol |  |  |  |  |  | 25 |  |  |  |
| Silicate |  |  |  | 26.8 (15) |  |  |  |  |  |
| Alkoxysilane condensate 1 |  |  |  |  |  |  |  |  |  |
| Alkoxysilane condensate 2 |  |  |  |  | 30.2 (15) | 20.1 (10) | 90.5 (45) |  | 20.1 (10) |
| Alkoxysilane condensate 3 |  |  |  |  |  |  |  | 23.4 (10) |  |
| Polyalkylene oxide chain-containing alkoxysilane compound |  |  |  |  |  |  |  |  |  |
| Rutile titanium oxide | 80 | 80 | 80 | 80 | 80 | 80 | 80 | 80 | 80 |

Regarding the numerical value: the solid content or the value in term of $SiO_2$ was described in parentheses.

TABLE 10

|  |  | Example 10 | Example 11 | Example 12 | Example 13 | Example 14 | Example 15 |
|---|---|---|---|---|---|---|---|
| Weathering resistance test (gloss retention %) |  | 80 | 83 | 77 | 81 | 80 | 75 |
| Heating/cooling repeating test | After 10 cycles | No abnormality | No abnormality | No abnormality | No abnormality | No abnormality | No abnormality |
|  | After 20 cycles | No abnormality | No abnormality | No abnormality | No abnormality | No abnormality | No abnormality |
|  | After 30 cycles | No abnormality | No abnormality | No abnormality | No abnormality | No abnormality | No abnormality |
| Water-striped contamination resistance test | After 1 month | ○ | ○ | ⊚ | ○ | ○ | ○ |
|  | After 2 months | ○ | ○ | ⊚ | ⊚ | ⊚ | ⊚ |
|  | After 3 months | ⊚ | ⊚ | ⊚ | ⊚ | ⊚ | ⊚ |
|  | After 1 year | ⊚ | ⊚ | ⊚ | ⊚ | ⊚ | ⊚ |

TABLE 10-continued

|  |  | Example 16 | Example 17 | Example 18 | Example 19 | Example 20 | Example 21 |
|---|---|---|---|---|---|---|---|
| Weathering resistance test (gloss retention %) | | 83 | 80 | 78 | 83 | 85 | 80 |
| Heating/cooling repeating test | After 10 cycles | No abnormality | No abnormality | No abnormality | No abnormality | No abnormality | No abnormality |
| | After 20 cycles | No abnormality | No abnormality | No abnormality | No abnormality | No abnormality | No abnormality |
| | After 30 cycles | No abnormality | No abnormality | No abnormality | No abnormality | No abnormality | No abnormality |
| Water-striped contamination resistance test | After 1 month | ○ | ○ | ○ | ○ | ○ | ⊙ |
| | After 2 months | ○ | ○ | ⊙ | ○ | ⊙ | ⊙ |
| | After 3 months | ⊙ | ⊙ | ⊙ | ⊙ | ⊙ | ⊙ |
| | After 1 year | ⊙ | ⊙ | ⊙ | ⊙ | ⊙ | ⊙ |

TABLE 11

|  |  | Comparative Example 8 | Comparative Example 9 | Comparative Example 10 | Comparative Example 11 | Comparative Example 12 | Comparative Example 13 | Comparative Example 14 | Comparative Example 15 | Comparative Example 16 |
|---|---|---|---|---|---|---|---|---|---|---|
| Weathering resistance test (gloss retention %) | | 58 | 75 | 61 | 79 | 80 | 63 | 81 | 83 | 55 |
| Heating/cooling repeating test | After 10 cycles | No abnormality | No abnormality | No abnormality | Crack occurred | Crack occurred | No abnormality | Crack occurred | No abnormality | No abnormality |
| | After 20 cycles | No abnormality | No abnormality | No abnormality | — | — | No abnormality | — | No abnormality | No abnormality |
| | After 30 cycles | No abnormality | No abnormality | Blister occurred | — | — | No abnormality | — | No abnormality | No abnormality |
| Water-striped contamination resistance test | After 1 month | × | Δ | × | Δ | ⊙ | Δ | ⊙ | Δ | Δ |
| | After 2 months | × | × | × | ○ | ⊙ | Δ | ⊙ | × | ⊙ |
| | After 3 months | × | × | × | ○ | ⊙ | ○ | Crack occurred | × | ⊙ |
| | After 1 year | × | × | × | Crack occurred | Crack occurred | ○ | — | × | ⊙ |

TABLE 12

| | |
|---|---|
| Polyol 5 | Solution grade acrylic polyol, SP:8.7, weight-average molecular weight:15000, hydroxyl group value:50 KOH mg/g, nonvolatile content:50%, kind of solvent: mineral spirit |
| Polyol 6 | NAD grade acrylic polyol, SP:9.1, weight-average molecular weight:50000, hydroxyl group value:50 KOH mg/g, nonvolatile content:50%, kind of solvent: mineral spirit |
| Isocyanate | Mineral spirit solution of isocyanurate type acrylic polyol of hexamethylene diisocyanate, nonvolatile content:40%, NCO content: 8.0% |
| Alkoxysilane condensate 9 | Described in Synthesis Example III |
| Alkoxysilane condensate 10 | Described in Synthesis Example III |
| Alkoxysilane condensate 11 | Described in Synthesis Example III |
| Alkoxysilane condensate 12 | Described in Synthesis Example III |
| Alkoxysilane condensate 13 | Described in Synthesis Example III |
| Alkoxysilane condensate 14 | Monobutoxytrimethoxysilane low condensate (existence proportion of butyl group:22%), condensation degree:about 8, weight-average molecular weight:1000, nonvolatile content: 99.8%, Residual ratio of silica:48.0% by weight |
| PEO-alkoxysilane compound 1 | Described in Synthesis Example II |
| Ethyl silicate | Weight-average molecular weight:600, nonvolatile content:100%, residual ratio of silica:40% by weight |
| Methyl silicate B | Weight-average molecular weight:500, nonvolatile content:100%, residual ratio of silica:51% by weight |
| Methyl silicate A | Weight-average molecular weight:1000, nonvolatile content:100%, residual ratio of silica:56% by weight |
| Pigment | Rutile titanium oxide |

TABLE 13

|  | Example 22 | Example 23 | Example 24 | Example 25 | Example 26 | Example 27 | Example 28 | Example 29 | Example 30 |
| --- | --- | --- | --- | --- | --- | --- | --- | --- | --- |
| Polyol 5 | 200 | 200 | 200 | 200 |  |  | 60 | 200 | 200 |
| (solid content) | (100) | (100) | (100) | (100) |  |  | (30) | (100) | (100) |
| Polyol 6 |  |  |  |  | 200 | 200 | 140 |  |  |
| (solid content) |  |  |  |  | (100) | (100) | (70) |  |  |
| Isocyanate | 47.0 | 47.0 | 47.0 | 47.0 | 47.0 | 47.0 | 47.0 | 47.0 | 47.0 |
| [NCO/OH ratio] | (1.0) | (1.0) | (1.0) | (1.0) | (1.0) | (1.0) | (1.0) | (1.0) | (1.0) |
| Alkoxysilane condensate 9 |  | 13.3 | 13.3 |  |  |  |  |  |  |
| Alkoxysilane condensate 10 |  |  |  | 29.8 | 6.0 |  | 49.7 |  | 11.5 |
|  |  |  |  | (15.0) | (3.0) |  | (25.0) |  | (5.0) |
| Alkoxysilane condensate 11 |  |  |  |  |  | 34.3 |  | 9.2 |  |
|  |  |  |  |  |  | (15.0) |  | (4.0) |  |
| Alkoxysilane condensate 12 |  |  |  |  |  |  |  |  |  |
| Alkoxysilane condensate 13 |  |  |  |  |  |  |  |  |  |
| Alkoxysilane condensate 14 | 10.5 |  |  |  |  |  |  |  |  |
|  | (5.0) |  |  |  |  |  |  |  |  |
| PEO-alkoxysilane compound 1 |  |  |  |  |  |  |  | 3.0 | 5.0 |
| Ethyl silicate |  |  |  |  |  |  |  |  |  |
| Methyl silicate B |  |  |  |  |  |  |  |  |  |
| Methyl silicate A |  |  |  |  |  |  |  |  |  |
| Pigment | 80.0 | 80.0 | 80.0 | 80.0 | 80.0 | 80.0 | 80.0 | 80.0 | 80.0 |

※ Unit of all numerical values is "parts by weight"
※ Regarding silicates, the actual addition amount was described in the upper column, while the value in terms of SiO$_2$ was described in parentheses of the lower column

TABLE 14

|  | Comparative Example 17 | Comparative Example 18 | Comparative Example 19 | Comparative Example 20 | Comparative Example 21 | Comparative Example 22 | Comparative Example 23 | Comparative Example 24 | Comparative Example 25 |
| --- | --- | --- | --- | --- | --- | --- | --- | --- | --- |
| Polyol 5 | 200 | 200 | 200 | 200 | 200 | 200 | 200 | 200 | 200 |
| (solid content) | (100) | (100) | (100) | (100) | (100) | (100) | (100) | (100) | (100) |
| Polyol 6 |  |  |  |  |  |  |  |  |  |
| (solid content) |  |  |  |  |  |  |  |  |  |
| Isocyanate | 47.0 | 47.0 | 61.0 | 47.0 | 47.0 | 47.0 | 47.0 | 47.0 | 47.0 |
| [NCO/OH ratio] | (1.0) | (1.0) | (1.3) | (1.0) | (1.0) | (1.0) | (1.0) | (1.0) | (1.0) |
| Alkoxysilane condensate 9 |  |  |  |  |  | 1.0 | 160 |  |  |
|  |  |  |  |  |  | (0.4) | (60.0) |  |  |
| Alkoxysilane condensate 10 |  |  |  |  |  |  |  |  |  |
| Alkoxysilane condensate 11 |  |  |  |  |  |  |  |  |  |
| Alkoxysilane condensate 12 |  |  |  | 30.0 |  |  |  |  |  |
|  |  |  |  | (10.0) |  |  |  |  |  |
| Alkoxysilane condensate 13 |  |  |  |  | 29.9 |  |  |  | 29.9 |
|  |  |  |  |  | (5.0) |  |  |  | (5.0) |
| Alkoxysilane condensate 14 |  |  |  |  |  |  |  |  |  |
| Polyalkylene oxide chain-containing alkoxysilane compound |  |  |  |  |  |  |  |  | 3.0 |
| Ethyl silicate |  | 12.5 |  |  |  |  |  |  |  |
|  |  | (5.0) |  |  |  |  |  |  |  |
| Methyl silicate B |  |  | 20.0 |  |  |  |  |  |  |
|  |  |  | (10.0) |  |  |  |  |  |  |
| Methyl silicate A | 17.9 |  |  |  |  |  |  |  |  |
|  | (10.0) |  |  |  |  |  |  |  |  |
| Pigment | 80.0 | 80.0 | 80.0 | 80.0 | 80.0 | 80.0 | 80.0 | 80.0 | 80.0 |

※ Unit of all numerical values is "parts by weight".
※ Regarding silicates, the actual addition amount was described in the upper column, while the value in term of SiO$_2$ was described in parentheses of the lower column.

TABLE 15

|  | | Example 22 | Example 23 | Example 24 | Example 25 | Example 26 | Example 27 | Example 28 | Example 29 | Example 30 |
|---|---|---|---|---|---|---|---|---|---|---|
| Compatibility | | ○ | ○ | ○ | ○ | ○ | ○ | ○ | ○ | ○ |
| Contact angle | First | 67 | 65 | 67 | 64 | 67 | 64 | 63 | 56 | 53 |
| | Second | 61 | 61 | 62 | 58 | 63 | 59 | 57 | 49 | 47 |
| | Third | 57 | 57 | 58 | 54 | 59 | 54 | 51 | 47 | 44 |
| | Fourth | 52 | 53 | 53 | 49 | 55 | 50 | 48 | 42 | 40 |
| Water-striped contamination resistance | After 1 month | ○ | ○ | ○ | ○ | ○ | ○ | ○ | ◎ | ◎ |
| | After 3 months | ○ | ○ | ○ | ◎ | ◎ | ◎ | ◎ | ◎ | ◎ |
| | After 6 months | ◎ | ◎ | ◎ | ◎ | ◎ | ◎ | ◎ | ◎ | ◎ |
| Stain resistance | | ○ | ○ | ○ | ○ | ○ | ○ | ○ | ◎ | ◎ |

|  | | Comparative Example 17 | Comparative Example 18 | Comparative Example 19 | Comparative Example 20 | Comparative Example 21 | Comparative Example 22 | Comparative Example 23 | Comparative Example 24 | Comparative Example 25 |
|---|---|---|---|---|---|---|---|---|---|---|
| Compatibility | | × | × | ○ | ○ | ○ | ○ | ○ | ○ | ○ |
| Contact angle (degree) after water dipping | First | 82 | 82 | 82 | 82 | 85 | 85 | 84 | 60 | 75 |
| | Second | 80 | 81 | 81 | 81 | 84 | 84 | 83 | 59 | 73 |
| | Third | 81 | 80 | 80 | 79 | 80 | 84 | 82 | 58 | 70 |
| | Fourth | 80 | 81 | 80 | 79 | 80 | 83 | 82 | 58 | 70 |
| Water-striped contamination resistance | After 1 month | × | × | × | × | × | × | × | Crack occurred on the surface | × |
| | After 3 months | × | × | × | × | × | × | × | | Δ |
| | After 6 months | × | × | × | × | × | × | × | | Δ |
| Stain resistance | | × | × | × | × | × | × | × | ○ | Δ |

TABLE 16

|  | Kind of silicate | | Kind of modified alcohol | | | Ester interchange rate | | Amount of $SiO_2$ Weight % |
|---|---|---|---|---|---|---|---|---|
| | Kind | Addition Amount (parts by weight) | Number of carbon atoms | Alcohol | Addition amount (parts by weight) | Number of mols | % | |
| Alkoxysilane condensate 15 | Methyl silicate B | 100 | C4 | n-butyl alcohol | 44.4 | 3 | 30 | 40.7 |
| Alkoxysilane condensate 16 | Methyl silicate B | 100 | C6 | n-hexyl alcohol | 20.4 | 1 | 10 | 4.7 |
| Alkoxysilane condensate 17 | Methyl silicate A | 100 | C4 | n-butyl alcohol | 51.8 | 7 | 38 | 43.2 |
| Alkoxysilane condensate 18 | Methyl silicate A | 100 | C5 | n-amyl alcohol | 35.2 | 4 | 22 | 45.7 |
| Alkoxysilane condensate 19 | Methyl silicate A | 100 | C6 | n-hexyl alcohol | 20.4 | 2 | 11 | 49.1 |
| Alkoxysilane condensate 20 | Methyl silicate A | 100 | C7 | n-hepcyl alcohol | 58.0 | 5 | 27 | 39.4 |
| Alkoxysilane condensate 21 | Methyl silicate A | 100 | C4 | n-butyl alcohol | 88.8 | 12 | 66 | 37.2 |
| Alkoxysilane condensate 22 | Methyl silicate A | 100 | C13 | n-dodecyl alcohol | 120 | 6 | 33 | 27.8 |
| Alkoxysilane condensate 23 | | | C4 | | | | 22 | 48.0 |
| Methyl silicate A | | | | | | | | 56.0 |
| Methyl silicate B | | | | | | | | 51.0 |

Alkoxysilane condensate: weight-average molecular weight: 1200, average condensation degree: about 8, nonvolatile content: 99.8% (low condensate of monobutoxytrimethoxysilane)
Methyl silicate A: weight-average molecular weight: 1000, average condensation degree: about 8, nonvolatile content: 100%
Methyl silicate B: weight-average molecular weight: 500, average condensation degree: about 4, nonvolatile content: 100%

TABLE 17

| | |
|---|---|
| Polyol 5 | Solution grade acrylic polyol, SP:8.7, weight-average molecular weight:15000, hydroxyl group value:50 KOH mg/g, nonvolatile content:50%, kind of solvent: mineral spirit |
| Polyol 6 | NAD grade acrylic polyol, SP:9.1, weight-average molecular weight:50000, hydroxyl group value:50 KOH mg/g, nonvolatile content:50%, kind of solvent: mineral spirit |
| Isocyanate 4 | Mineral spirit solution of isocyanurate type acrylic polyol of hexamethylene diisocyanate, nonvolatile content:40%, NCO content: 8.0% |
| Alkoxysilane condensate 15–22 | Described in Synthesis Example I (see Table 16) |
| Alkoxysilane condensate 23 | Monobutoxytrimethoxysilane low condensate (existence proportion of butyl group:22%), condensation degree: about 8, weight-average molecular weight: 1000, nonvolatile content: 99.8%, Residual ratio of silica: 48.0% by weight |
| Amine compound 1 | Di n-butylamine |
| Amine compound 2 | Triethylamine |
| Ethyl silicate | Weight-average molecular weight:600, nonvolatile content:100%, residual ratio of silica:40% by weight |
| Methyl silicate B | Weight-average molecular weight:500, nonvolatile content:100%, residual ratio of silica:51% by weight |
| Methyl silicate A | Weight-average molecular weight:1000, nonvolatile content:100%, residual ratio of silica:56% by weight |
| Polyalkylene oxide chain-containing alkoxysilane compound | Described in Synthesis Example II |
| Pigment | Rutile titanium oxide |

TABLE 18

| | Example 31 | Example 32 | Example 33 | Example 34 | Example 35 | Example 36 | Example 37 | Example 38 |
|---|---|---|---|---|---|---|---|---|
| Polyol 5 (solid content) | 200 (100) | 200 (100) | 200 (100) | | 200 (100) | 200 (100) | 200 (100) | 200 (100) |
| Polyol 6 (solid content) | | | | 200 (100) | | | | |
| Isocyanate 4 | 47.0 | 47.0 | 47.0 | 61.3 | 47.0 | 47.0 | 47.0 | 47.0 |
| [NCO/OH ratio] | (1.0) | (1.0) | (1.0) | (1.3) | (1.0) | (1.0) | (1.0) | (1.0) |
| Alkoxysilane condensate 15 | 12.3 (5.0) | | | | | | | |
| Alkoxysilane condensate 16 | | 11.3 (5.0) | | | | | | |
| Alkoxysilane condensate 17 | | | 11.5 (5.0) | | | | | |
| Alkoxysilane condensate 18 | | | | | 11.0 (5.0) | | | 22.0 (11.0) |
| Alkoxysilane condensate 19 | | | | | | 20.5 (10.0) | | |
| Alkoxysilane condensate 20 | | | | | | | 63.5 (25.0) | |
| Alkoxysilane condensate 21 | | | | | | | | |
| Alkoxysilane condensate 22 | | | | | | | | |
| Alkoxysilane condensate 23 | | | | | | | 21.0 (10.0) | |
| Amine compound 1 | | | | 0.3 | 0.5 | | 0.5 | 0.3 |
| Amine compound 2 | 0.3 | 0.3 | | | 0.5 | | | 0.1 |
| Ethyl silicate | | | | | | | | |
| Methyl silicate B | | | | | | | | |
| Methyl silicate A | | | | | | | | |
| Polyalkylene oxide chain-containing alkoxysilane compound | | | | | 10.0 | 5.0 | 1.0 | 3.0 |
| Pigment | 80.0 | 80.0 | 80.0 | 80.0 | 80.0 | 80.0 | 80.0 | 80.0 |

※ Unit of all numerical values is "parts by weight".
※ Regarding silicates, the actual addition amount was described in the upper column, while the value in term of $SiO_2$ was described in parentheses of the lower column

TABLE 19

| | Comparative Example 26 | Comparative Example 27 | Comparative Example 28 | Comparative Example 29 | Comparative Example 30 | Comparative Example 31 | Comparative Example 32 | Comparative Example 33 |
|---|---|---|---|---|---|---|---|---|
| Polyol 5 (solid content) | 200 (100) | 200 (100) | 200 (100) | 200 (100) | 200 (100) | 200 (100) | 200 (100) | 200 (100) |
| Polyol 6 (solid content) | | | | | | | | |
| Isocyanate 4 | 47.0 | 47.0 | 61.0 | 47.0 | 47.0 | 47.0 | 47.0 | 47.0 |
| [NCO/OH ratio] | (1.0) | (1.0) | (1.3) | (1.0) | (1.0) | (1.0) | (1.0) | (1.0) |
| Alkoxysilane condensate 15 | | | | | | | | |
| Alkoxysilane condensate 16 | | | | | | | | |
| Alkoxysilane condensate 17 | | | | | | | | |

TABLE 19-continued

|  | Comparative Example 26 | Comparative Example 27 | Comparative Example 28 | Comparative Example 29 | Comparative Example 30 | Comparative Example 31 | Comparative Example 32 | Comparative Example 33 |
|---|---|---|---|---|---|---|---|---|
| Alkoxysilane condensate 18 |  |  |  |  |  |  | 0.9 (0.4) | 131 (60.0) |
| Alkoxysilane condensate 19 |  |  |  |  |  |  |  |  |
| Alkoxysilane condensate 20 |  |  |  |  |  |  |  |  |
| Alkoxysilane condensate 21 |  |  |  | 13.5 (5.0) |  |  |  |  |
| Alkoxysilane condensate 22 |  |  |  |  |  | 36.0 (10.0) |  |  |
| Alkoxysilane condensate 23 |  |  |  |  |  |  |  |  |
| Amine compound 1 |  |  |  | 0.5 | 0.5 |  |  |  |
| Amine compound 2 |  |  |  |  |  |  |  |  |
| Ethyl silicate |  | 12.5 (5.0) |  |  |  |  |  |  |
| Methyl silicate B |  |  | 20.0 (10.0) |  |  |  |  |  |
| Methyl silicate A | 17.9 (10.0) |  |  |  |  |  |  |  |
| Polyalkylene oxide chain containing alkoxysilane compound |  |  |  |  |  |  |  |  |
| Pigment | 80.0 | 80.0 | 80.0 | 80.0 | 80.0 | 80.0 | 80.0 | 80.0 |

※ Unit of all numerical values is "parts by weight".
※ Regarding silicates, the actual addition amount was described in the upper column, while the value in term of $SiO_2$ was described in parentheses of the lower column

TABLE 20

|  |  | Example 31 | Example 32 | Example 33 | Example 34 | Example 35 | Example 36 | Example 37 | Example 38 |
|---|---|---|---|---|---|---|---|---|---|
| Compatibility |  | ○ | ○ | ○ | ○ | ○ | ○ | ○ | ○ |
| Contact angle (degree) | First | 67 | 70 | 67 | 62 | 59 | 58 | 60 | 66 |
|  | Second | 62 | 65 | 60 | 56 | 52 | 50 | 53 | 58 |
|  | Third | 58 | 60 | 57 | 46 | 46 | 44 | 47 | 54 |
| Anti-contamination property | After 1 month | ○ | ○ | ○ | ⊙ | ⊙ | ⊙ | ⊙ | ○ |
|  | After 3 months | ○ | ○ | ⊙ | ⊙ | ⊙ | ⊙ | ⊙ | ⊙ |
|  | After 6 months | ⊙ | ⊙ | ⊙ | ⊙ | ⊙ | ⊙ | ⊙ | ⊙ |
| Interlaminar adhesion property | After 16 hours | 10 | 10 | 10 | 10 | 10 | 10 | 10 | 10 |
|  | After 3 days | 10 | 10 | 10 | 10 | 10 | 10 | 10 | 10 |
|  | After 7 days | 10 | 10 | 10 | 10 | 10 | 10 | 10 | 10 |
| Stain resistance |  | ○ | ○ | ○ | ⊙ | ⊙ | ⊙ | ⊙ | ○ |

TABLE 21

|  |  | Comparative Example 26 | Comparative Example 27 | Comparative Example 28 | Comparative Example 29 | Comparative Example 30 | Comparative Example 31 | Comparative Example 32 | Comparative Example 33 |
|---|---|---|---|---|---|---|---|---|---|
| Compatibility |  | Δ | × | ○ | ○ | ○ | — | ○ | × |
| Contact angle (degree) | First | 82 | 82 | 82 | 83 | 85 | 85 | 84 | 60 |
|  | Second | 80 | 81 | 81 | 82 | 83 | 84 | 82 | 59 |
|  | Third | 79 | 80 | 81 | 81 | 80 | 84 | 80 | 58 |
| Anti-contamination property | After 1 month | × | × | × | × | × | × | × | Crack occurred on the surface |
|  | After 3 months | × | × | × | × | × | × | × |  |
|  | After 6 months | × | × | × | × | × | × | × |  |

TABLE 21-continued

|  |  | Comparative Example 26 | Comparative Example 27 | Comparative Example 28 | Comparative Example 29 | Comparative Example 30 | Comparative Example 31 | Comparative Example 32 | Comparative Example 33 |
|---|---|---|---|---|---|---|---|---|---|
| Interlaminar adhesion property | After 16 hours | 10 | 10 | 10 | 10 | 10 | 10 | 10 | 8 |
|  | After 3 days | 10 | 8 | 10 | 10 | 10 | 10 | 10 | 0 |
|  | After 7 days | 8 | 6 | 10 | 10 | 10 | 10 | 10 | 0 |
| Stain resistance |  | Δ | × | × | × | × | × | × | ⊚ |

TABLE 22

|  | Kind of silicate | | Kind of modified alcohol | | Ester interchange | | | Amount of SiO$_2$ weight % |
|---|---|---|---|---|---|---|---|---|
|  | Kind | Addition amount (parts by weight) | Number of carbons | Alcohol | Addition amount (parts by weight) | Number of mols | % |  |
| Methyl silicate A | — | — | — | — | — | — | — | 56.0 |
| Methyl silicate B | — | — | — | — | — | — | — | 59.0 |
| Ethyl silicate | — | — | — | — | — | — | — | 40.0 |
| Alkoxysilane condensate 24 | — | — | C4 | — | — | — | 22 | 48.0 |
| Alkoxysilane condensate 25 | Methyl silicate A | 100 | C4 | n-butyl alcohol | 44.5 | 6 | 33 | 44.7 |
| Alkoxysilane condensate 26 | Methyl silicate C | 100 | C3 | n-propil alcohol | 13.4 | 4 | 13 | 58.6 |
| Alkoxysilane condensate 27 | Methyl silicate C | 100 | C7 | n-hepcyl alcohol | 19.4 | 3 | 9 | 53.7 |
| Alkoxysilane condensate 28 | Methyl silicate A | 100 | C10 | n-decyl alcohol | 74.1 | 10 | 61 | 23.4 |
| Alkoxysilane condensate 29 | Methyl silicate A | 100 | C12 | n-dodecyl alto | 37.3 | 2 | 11 | 42.8 |

Methyl silicate A: weight-average molecular weight: 1000, average condensation degree: about 8, nonvolatile content: 100%

Methyl silicate C: weight-average molecular weight: 1800, average condensation degree: about 15, nonvolatile content: 100%

Ethyl silicate: weight-average molecular weight: 700, average condensation degree: about 5, nonvolatile content: 100%

Alkoxysilane condensate 24: Monobutoxytrimethoxysilane condensate having a weight-average molecular weight of 1000, an average condensation degree of about 8 and a nonvolatile content of 99.8%

TABLE 23

|  | Remarks |
|---|---|
| Acrylic resin 1 | weight-average molecular weight:95000, Tg:50° C., resin solid content:50%, monomer composition: methyl methacrylate, vinyl acetate, n-butyl methacrylate |
| Acrylic resin 2 | weight-average molecular weight:135000, Tg: 10° C., resin solid content:50%, monomer composition: methyl methacrylate, 2-ethylhexyl acrylate |
| Methyl silicate A | weight-average molecular weight:1000, condensation degree:about 8, nonvolatile content:100% |
| Ethyl silicate | weight-average molecular weight:700, condensation degree:about 5, nonvolatile content:100% |
| Alkoxysilane condensate 24 | Monobutoxytrimethoxysilane low condensate (existence proportion of butyl group:22%), condensation degree:about 8, weight-average molecular weight:1000, nonvolatile content:99.8%, Residual ratio of silica:48.0% by weight |
| Alkoxysilane condensate 25–29 | Described in Synthesis Example I (See Table 22) |
| Polyalkylene oxide chain-containing alkoxysilane compound 1 | Described in Synthesis Example 11 |
| Polyalkylene oxide chain-containing alkoxysilane compound 2 | Described in Synthesis Example II |
| Polyethylene glycol 1 | PEG-400 manufactured by Kowa Junyaku Co., Ltd., number-average molecular weight:400, nonvolatile content:100% |
| Polyethylene glycol 2 | PEG-1000 manufactured by Kowa Junyaku Co., Ltd., number-average molecular weight:1000, nonvolatile content:100% |
| Amine compound 2 | Triethylamine |
| Pigment | Rutile titanium oxide |

※ Tg: glass transition temperature

TABLE 24

|  | Example 39 | Example 40 | Example 41 | Example 42 | Example 43 | Example 44 | Comparative 34 | Comparative 35 | Comparative 36 |
|---|---|---|---|---|---|---|---|---|---|
| Acrylic resin 1 | 200 (100) |  | 200 (100) | 200 (100) |  |  | 200 (100) | 200 (100) | 200 (100) |
| Acrylic resin 2 |  | 200 (100) |  |  | 200 (100) | 200 (100) |  |  |  |
| Methyl silicate A |  |  |  |  |  |  |  |  |  |
| Ethyl silicate |  |  |  |  |  |  |  | 25.0 (10.0) | 25.0 (10.0) |
| Alkoxysilane condensate 24 | 21.0 (10.0) |  | 21.0 (10.0) |  |  |  |  |  |  |
| Alkoxysilane condensate 25 |  |  |  | 33.5 (15.0) |  |  |  |  |  |
| Alkoxysilane condensate 26 |  | 8.5 (5.0) |  |  | 8.5 (5.0) |  |  |  |  |
| Alkoxysilane condensate 27 |  |  |  |  |  | 37.0 (20.0) |  |  |  |
| Alkoxysilane condensate 28 |  |  |  |  |  |  |  |  |  |
| Alkoxysilane condensate 29 |  |  |  |  |  |  |  |  |  |
| Polyalkylene oxide chain-containing alkoxysilane compound 1 | 5.0 |  | 3.0 |  |  | 3.0 |  |  |  |
| Polyalkylene oxide chain-containing alkoxysilane compound 2 |  |  |  | 5.0 | 5.0 |  |  |  |  |
| Polyethylene glycol 1 |  |  |  |  |  |  |  |  | 15.0 |
| Polyethylene glycol 2 |  |  |  |  |  |  |  |  |  |
| Amine compound 2 | 0.3 | 0.3 |  |  |  |  |  |  |  |
| Pigment | 80.0 | 80.0 | 80.0 | 80.0 | 80.0 | 80.0 | 80.0 | 80.0 | 80.0 |

|  | Comparative Example 37 | Comparative Example 38 | Comparative Example 39 | Comparative Example 40 | Comparative Example 41 |
|---|---|---|---|---|---|
| Acrylic resin 1 |  | 200 (100) |  | 200 (100) | 200 (100) |
| Acrylic resin 2 | 200 (100) |  | 200 (100 |  |  |
| Methyl silicate A | 18.0 (10.0) |  |  |  |  |
| Ethyl silicate |  |  |  |  |  |
| Alkoxysilane condensate 24 |  |  |  |  |  |
| Alkoxysilane condensate 25 |  |  |  |  |  |
| Alkoxysilane condensate 26 |  |  |  | 0.9 (0.5) | 68.0 840.0) |
| Alkoxysilane condensate 27 |  |  |  |  |  |
| Alkoxysilane condensate 28 |  |  | 21.5 (5.0) |  |  |
| Alkoxysilane condensate 29 |  |  | 23.5 (10.0) |  |  |
| Polyalkylene oxide chain-containing alkoxysilane compound 1 |  |  |  | 1.0 |  |
| Polyalkylene oxide chain-containing alkoxysilane compound 2 |  |  |  |  | 3.0 |
| Polyethylene glycol 1 |  |  |  |  |  |
| Polyethylene glycol 2 | 15.0 |  |  |  |  |
| Amine compound 2 |  |  |  |  |  |
| Pigment | 80.0 | 80.0 | 80.0 | 80.0 | 80.0 |

※Regarding the numerical value, the actual amount is described, and the solid content was described in parentheses. Regarding silicates, the actual addition amount was described in the upper column, while the value in terms of SiO$_2$ was described in parentheses of the lower column.[001b]

TABLE 25

|  |  | Example 39 | Example 40 | Example 41 | Example 42 | Example 43 | Example 44 | Comparative Example 34 | Comparative Example 35 | Comparative Example 36 |
|---|---|---|---|---|---|---|---|---|---|---|
| Appearance of the coat after curing |  | ○ | ○ | ○ | ○ | ○ | ○ | ○ | ○ | deterioration in gloss |
| Water dipping | First (contact angle) | 56° | 64° | 60° | 58° | 59° | 56° | 83° | 78° | 70° |
|  | Second (contact angle) | 48° | 50° | 47° | 44° | 48° | 44° | 83° | 76° | 68° |
|  | Third (contact angle) | 40° | 43° | 42° | 40° | 41° | 38° | 83° | 76° | 64° |
| Water-striped contamination | After 1 month | ◎ | ○ | ◎ | ◎ | ◎ | ◎ | × | × | × |
|  | After 3 months | ◎ | ◎ | ◎ | ◎ | ◎ | ◎ | × | Δ | × |
|  | After 6 months | ◎ | ◎ | ◎ | ◎ | ◎ | ◎ | × | Δ | × |
| Stain resistance |  | ◎ | ◎ | ◎ | ◎ | ◎ | ◎ | × | ○ | × |
| Remarks |  |  |  |  |  |  |  |  |  | Tack occurs on the surface. |

|  |  | Comparative Example 37 | Comparative Example 38 | Comparative Example 39 | Comparative Example 40 | Comparative Example 41 |
|---|---|---|---|---|---|---|
| Appearance of the coat after curing |  | deterioration in gloss | ○ | ○ | ○ | ○ |
| Water dipping | First (contact angle) | 66° | 74° | 76° | 72° | 54° |
|  | Second (contact angle) | 63° | 70° | 72° | 70° | 50° |
|  | Third (contact angle) | 60° | 68° | 72° | 70° | 48° |
| Water-striped contamination | After 1 month | × | × | × | × | Crack occurred on the surface |
|  | After 3 months | × | Δ | × | × |  |
|  | After 6 months | × | Δ | × | Δ |  |
| Stain resistance |  | × | ○ | ○ | ○ | ○ |
| Remarks |  | Tack occurs on the surface. |  |  |  |  |

TABLE 26

|  | Example 45 | Example 46 | Example 47 | Example 48 | Example 49 | Example 50 | Example 51 |
|---|---|---|---|---|---|---|---|
| Alkoxysilyl group-containing acrylic resin | 100 (200) | 100 (200) | 100 (200) | 100 (200) | 100 (200) | 100 (200) | 100 (200) |
| Alkoxysilane condensate 1 | 5.0 (9.4) |  | 8.0 (15.1) |  |  |  |  |
| Alkoxysilane condensate 2 |  |  |  | 6.0 (12.1) |  |  | 3.0 (6.0) |
| Alkoxysilane condensate 3 |  |  |  |  | 11.0 (23.5) |  |  |
| Alkoxysilane condensate 4 |  |  |  |  |  | 5.0 (11.2) |  |
| Alkoxysilane condensate 5 |  | 15.0 (45.4) |  |  |  |  |  |
| Alkoxysilane condensate 6 |  |  |  |  |  |  |  |
| Alkoxysilane condensate 7 |  |  |  |  |  |  |  |
| Alkoxysilane condensate 8 |  |  |  |  |  |  |  |

TABLE 26-continued

|  | Example 45 | Example 46 | Example 47 | Example 48 | Example 49 | Example 50 | Example 51 |
|---|---|---|---|---|---|---|---|
| Methyl silicate A |  |  |  |  |  |  |  |
| PEO-alkoxysilane compound 1 |  |  | 3.0 | 5.0 |  |  |  |
| PEO-alkoxysilane compound 2 |  |  |  |  | 10.0 | 15.0 | 10.0 |
| Rutile titanium oxide | 80 | 80 | 80 | 80 | 80 | 80 | 80 |
| Dibutyltin laurate | 2.0 | 2.0 | 2.0 |  |  |  |  |
| Dibutyltin maleate |  |  |  | 2.0 | 2.0 | 2.0 | 2.0 |

(Note)
① The numerical value represents a solid content. The actual addition amount is described in parentheses.
② Regarding alkoxysilane condensate and silicate, the value in terms of $SiO_2$ was described. The actual addition amount was described in parentheses.

TABLE 27

|  | Comparative Example 42 | Comparative Example 43 | Comparative Example 44 | Comparative Example 45 | Comparative Example 46 | Comparative Example 47 |
|---|---|---|---|---|---|---|
| Alkoxysilyl group-containing acrylic resin | 100 (200) | 100 (200) | 100 (200) | 100 (200) | 100 (200) | 100 (200) |
| Alkoxysilane condensate 1 |  |  | 45.0 (84.9) |  |  |  |
| Alkoxysilane condensate 2 |  |  |  |  |  |  |
| Alkoxysilane condensate 3 |  |  |  |  |  |  |
| Alkoxysilane condensate 4 |  |  |  |  |  |  |
| Alkoxysilane condensate 5 |  |  |  |  |  |  |
| Alkoxysilane condensate 6 |  |  |  | 10.0 (22.9) |  |  |
| Alkoxysilane condensate 7 |  |  |  |  | 20.0 (67.8) |  |
| Alkoxysilane condensate 8 | 15.0 (35.1) |  |  |  |  |  |
| Methyl silicate A |  |  |  |  |  | 3.0 (5.4) |
| PEO-alkoxysilane compound 1 |  | 3.0 | 5.0 |  | 3.0 |  |
| PEO-alkoxysilane compound 2 |  |  |  | 15.0 |  | 10.0 |
| Rutile titanium oxide | 80 | 80 | 80 | 80 | 80 | 80 |
| Dibutyltin laurate | 2.0 | 2.0 | 2.0 |  |  |  |
| Dibutyltin maleate |  |  |  | 2.0 | 2.0 | 2.0 |

(Note)
① The numerical value represents a solid content. The actual addition amount is described in parentheses.
② Regarding alkoxysilane condensate and silicate, the value in term of $SiO_2$ was described. The actual addition amount was described in parentheses.

TABLE 28

|  | Example |  |  |  |  |  |  | Comparative Examples |  |  |  |  |  |
|---|---|---|---|---|---|---|---|---|---|---|---|---|---|
|  | 45 | 46 | 47 | 48 | 49 | 50 | 51 | 42 | 43 | 44 | 45 | 46 | 47 |
| Before dipping in water | 69 | 67 | 58 | 56 | 56 | 50 | 56 | 76 | 74 | 66 | 71 | 78 | 60 |
| First dipping in water | 52 | 45 | 40 | 41 | 38 | 48 | 44 | 74 | 70 | 43 | 70 | 76 | 58 |
| Second dipping in water | 46 | 41 | 36 | 37 | 34 | 44 | 40 | 72 | 67 | 36 | 68 | 76 | 54 |
| Third dipping in water | 40 | 34 | 30 | 29 | 30 | 40 | 36 | 72 | 62 | 30 | 67 | 74 | 54 |
| After 1 month | −2.4 | −2.2 | −1.2 | −1.0 | −1.0 | −0.9 | −2.0 | −6.8 | −4.9 | −1.4 | −5.2 | −6.6 | −3.6 |
| After 3 months | −1.8 | −1.6 | −1.1 | −0.9 | −0.9 | −0.7 | −1.8 | −6.6 | −5.2 | Whole | −5.8 | −7.1 | −2.8 |
| After 6 months | −1.0 | −1.3 | −0.9 | −0.8 | −0.8 | −0.6 | −1.4 | −6.0 | −4.7 | area | −5.1 | −9 | −1.4 |
| After 1 year | −0.9 | −0.6 | −0.7 | −0.7 | −0.7 | −0.6 | −0.9 | −5.4 | −4.0 | crack occurred | −4.7 | −10 | −1.2 |
| After 1 month | ○ | ○ | ⊚ | ⊚ | ⊚ | ⊚ | ⊚ | × | ○ | ⊚ | △ | △ | △ |
| After 3 months | ⊚ | ⊚ | ⊚ | ⊚ | ⊚ | ⊚ | ⊚ | × | △ | Whole | △ | × | ○ |
| After 6 months | ⊚ | ⊚ | ⊚ | ⊚ | ⊚ | ⊚ | ⊚ | × | × | area | × | × | ⊚ |
| After 1 year | ⊚ | ⊚ | ⊚ | ⊚ | ⊚ | ⊚ | ⊚ | × | × | crack occurred | × | × | ⊚ |
| Stain resistance | ⊚ | ⊚ | ⊚ | ⊚ | ⊚ | ⊚ | ⊚ | × | △ | ⊚ | △ | × | ⊚ |

What is claimed is:

1. An anti-contamination coating composition comprising a tetraalkoxysilane condensate (C1) which is a tetraalkoxysilane condensate having an average condensation degree of 4 to 20 and which has an alkyl group having 1 to 2 carbon atoms and an alkyl group having 3 to 10 carbon atoms, the alkyl group having 3 to 10 carbon atoms being contained in the amount of 5 to 50% by equivalent based on all alkyl groups in the condensate, said tetraalkoxysilane condensate being present in the amount of 1 to 30 parts by weight in term of $SiO_2$ relative to 100 parts by weight of the solid content of an acrylic copolymer resin (AC) which contains an acrylate and/or a methacrylate monomer and has a glass transition temperature of 0 to 100° C.

2. The anti-contamination coating composition according to claim 1, further comprising a hydrophilic alkoxysilane compound (D) having a weight-average molecular weight of 150 to 3500 and containing an alkylene oxide chain having repeating units of 2 to 40 wherein the hydrophilic alkoxysilane is present in the solid content of 0.1 to 20 parts by weight relative to 100 parts by weight of the resin solid content of the acrylic copolymer resin (AC).

3. The anti-contamination coating composition according to claim 1, further comprising the amine compound (E) which is present in the solid content of 0.02 to 5.0 parts by weight relative to 100 parts by weight of the resin solid content of the acrylic copolymer resin (AC).

4. An anti-contamination coating composition comprising a compound (C1) which is a tetraalkoxysilane condensate having an average condensation degree of 4 to 20 and which has an alkyl group having 1 to 2 carbon atoms and an alkyl group having 3 to 10 carbon atoms, the alkyl group having 3 to 10 carbon atoms being contained in the amount of 5 to 50% by equivalent based on all alkyl groups in the condensate, the tetraalkoxysilane condensate being present in the amount of 1.0 to 20.0 parts by weight in term of $SiO_2$ relative to 100 parts by weight of the solid content of an alkoxysilyl group-containing acrylic copolymer resin (AS) which has a group represented by the general formula (chemical formula 1)

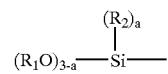

wherein $R_1$ represents an alkyl group having 1 to 10 carbon atoms; $R_2$ represents a hydrogen atom or a monovalent hydrocarbon group selected from the group consisting of alkyl, aryl and aralkyl groups having 1 to 10 carbon atoms; and a represents 0, 1 or 2.

5. The anti-contamination coating composition according to claim 4, wherein the content of (C1) is from 1.0 to 10 parts by weight relative to 100 parts by weight of the solid content of the alkoxysilyl group-containing acrylic copolymer resin (AS).

6. The anti-contamination coating composition according to claim 4, further comprising the hydrophilic alkoxysilane compound (D) having a weight-average molecular weight of 150 to 3500 and containing a poly alkylene oxide chain having repeating units of 2 to 40 which is present in the solid content of 0.1 to 20 parts by weight.

* * * * *

UNITED STATES PATENT AND TRADEMARK OFFICE
CERTIFICATE OF CORRECTION

PATENT NO.      : 6,573,321 B2
DATED           : June 3, 2003
INVENTOR(S)     : Hidehito Karuga et al.

It is certified that error appears in the above-identified patent and that said Letters Patent is hereby corrected as shown below:

<u>Title page,</u>
Item [56], References Cited, U.S. PATENT DOCUMENTS, insert:
-- 5,210,246    5/1993  Tanaka et al..................556/413 --.

<u>Column 1,</u>
Line 7, "U.S. Pat. No. 6,271,292" should read -- U.S. Pat. No. 6,271,293 --.

<u>Column 2,</u>
Line 22, "users and builder" should read -- users and builders --.

<u>Column 4,</u>
Line 24, "organolisilicate" should read -- organosilicate --.
Line 64, "in term of" should read -- in terms of --.

<u>Column 6,</u>
Line 20, "in amount of" should read -- in an amount of --.

<u>Column 7,</u>
Line 2, "in term of" should read -- in terms of --.
Line 12, "weight of A2" should read -- weight of (A2) --.

<u>Column 10,</u>
Line 1, "DRAWINGS" should read -- DRAWING --

<u>Column 11,</u>
Line 5, "the followings:" should read -- the following: --.
Line 18, "VeoVa" should read -- Veova --.

<u>Column 14,</u>
Line 33, "Bamoc" should read -- Barnoc --.

<u>Column 15,</u>
Line 28, "(C2))exists" should read -- (C2)) exists -- (insert space).
Line 32, "having large number" should read -- have a large number --.
Line 46, "one and more" should read -- one or more --.
Line 54, "having 3 or 10" should read -- having 3 to 10 --.

UNITED STATES PATENT AND TRADEMARK OFFICE
CERTIFICATE OF CORRECTION

PATENT NO. : 6,573,321 B2
DATED : June 3, 2003
INVENTOR(S) : Hidehito Karuga et al.

It is certified that error appears in the above-identified patent and that said Letters Patent is hereby corrected as shown below:

<u>Column 16,</u>
Line 44, "in term of" should read -- in terms of --.

<u>Column 17,</u>
Line 25, "mercapt" should read -- mercapto --.

<u>Column 19,</u>
Line 38, "react each" should read -- react with each --.

<u>Column 20,</u>
Line 22, "ethyl methacryl ate." should read -- ethylmethacrylate. --.

<u>Column 21,</u>
Line 31, "in term of" should read -- in terms of --.

<u>Column 22,</u>
Line 53, in Chemical Formula 2, line 2, "SI" should read -- Si --.

<u>Column 27,</u>
Line 33, "dibutylthin" should read -- dibutyltin --.

<u>Column 30,</u>
Line 64, "30 sum" should read -- 30 μm --.

<u>Column 31,</u>
Line 27, "Shell Petroleurn" should read -- Shell Petroleum --.

<u>Column 32,</u>
Line 5, "in term of" should read -- in terms of --.

<u>Column 36,</u>
Line 56, "from I month" should read -- from 1 month --.

<u>Column 38,</u>
Line 30, in Table 2, last column, third row: "Beova 9" should read -- Veova 9 --.
Line 37, in Table 2, last column, last row: "Beova 9" should read -- Veova 9 --.

UNITED STATES PATENT AND TRADEMARK OFFICE
CERTIFICATE OF CORRECTION

PATENT NO. : 6,573,321 B2
DATED : June 3, 2003
INVENTOR(S) : Hidehito Karuga et al.

It is certified that error appears in the above-identified patent and that said Letters Patent is hereby corrected as shown below:

<u>Columns 41-42,</u>
Table 7, Column 1, Row 6, "Caprolactoetriol" should read -- Caprolactontriol --.

<u>Columns 55-56,</u>
Table 22, under column heading "Alcohol", last row, "alto" should read -- alcohol --.

<u>Column 57,</u>
After note under Table 24, end of text: delete "[001b]".

<u>Column 63,</u>
Lines 10-11, "in term of" should read -- in terms of --.

<u>Column 64,</u>
Line 4, "in term of" should read -- in terms of --.
Line 28, "poly alkylene" should read -- polyalkylene --.

Signed and Sealed this

Twenty-first Day of October, 2003

JAMES E. ROGAN
*Director of the United States Patent and Trademark Office*